United States Patent [19]
Niida et al.

[11] Patent Number: 6,052,507
[45] Date of Patent: *Apr. 18, 2000

[54] REPRODUCING APPARATUS FOR REPRODUCING SIGNALS FROM A RECORDING MEDIUM WHICH STORES NORMAL REPRODUCTION DATA AND SPECIFIC REPRODUCTION DATA

[75] Inventors: Mitsuo Niida, Kawasaki; Akio Fujii; Yoshiki Ishii, both of Yokohama; Akiyoshi Hamanaka, Hachioji; Shinji Ohnishi, Yokohama, all of Japan

[73] Assignee: Canon Kabushiki Kaisha, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/557,815

[22] Filed: Nov. 14, 1995

[30] Foreign Application Priority Data

Nov. 14, 1994 [JP] Japan .................................. 6-278906
Nov. 14, 1994 [JP] Japan .................................. 6-278907
Dec. 28, 1994 [JP] Japan .................................. 6-328492

[51] Int. Cl.$^7$ .............................. H04N 5/91; H04N 5/917
[52] U.S. Cl. ............................. 386/68; 386/109; 386/71
[58] Field of Search .................................. 386/109, 111, 386/112, 46, 104, 96, 95, 68, 67, 27, 33, 34, 71, 85; 360/32; H04N 5/91, 5/917

[56] References Cited

U.S. PATENT DOCUMENTS

| | | | |
|---|---|---|---|
| 4,742,519 | 5/1988 | Abe et al. | 371/38 |
| 5,140,437 | 8/1992 | Yonemitsu et al. | 386/112 |
| 5,212,562 | 5/1993 | Ogura | 386/88 |
| 5,504,585 | 4/1996 | Fujinami et al. | 386/111 |
| 5,587,806 | 12/1996 | Yamada | 386/111 |

FOREIGN PATENT DOCUMENTS

| | | | |
|---|---|---|---|
| 0618724 | 10/1994 | European Pat. Off. | H04N 5/92 |
| 86-9411 | 12/1986 | Rep. of Korea | G11B 20/18 |
| WO94176631 | 8/1994 | WIPO | H04N 5/782 |

*Primary Examiner*—Robert Chevalier
*Attorney, Agent, or Firm*—Fitzpatrick, Cella, Harper & Scinto

[57] ABSTRACT

A recording/reproducing apparatus for recording encoded data on a recording medium by time sequentially and independently recording normal reproduction data and specific reproduction data contained in the encoded data, the normal reproduction data and specific reproduction data including decode control information. The recording/reproducing apparatus includes a detection circuit for detecting the decode control information from reproduced data in a specific reproduction mode and in a normal reproduction mode, and a memory circuit for storing the control information detected by the detection circuit.

52 Claims, 13 Drawing Sheets

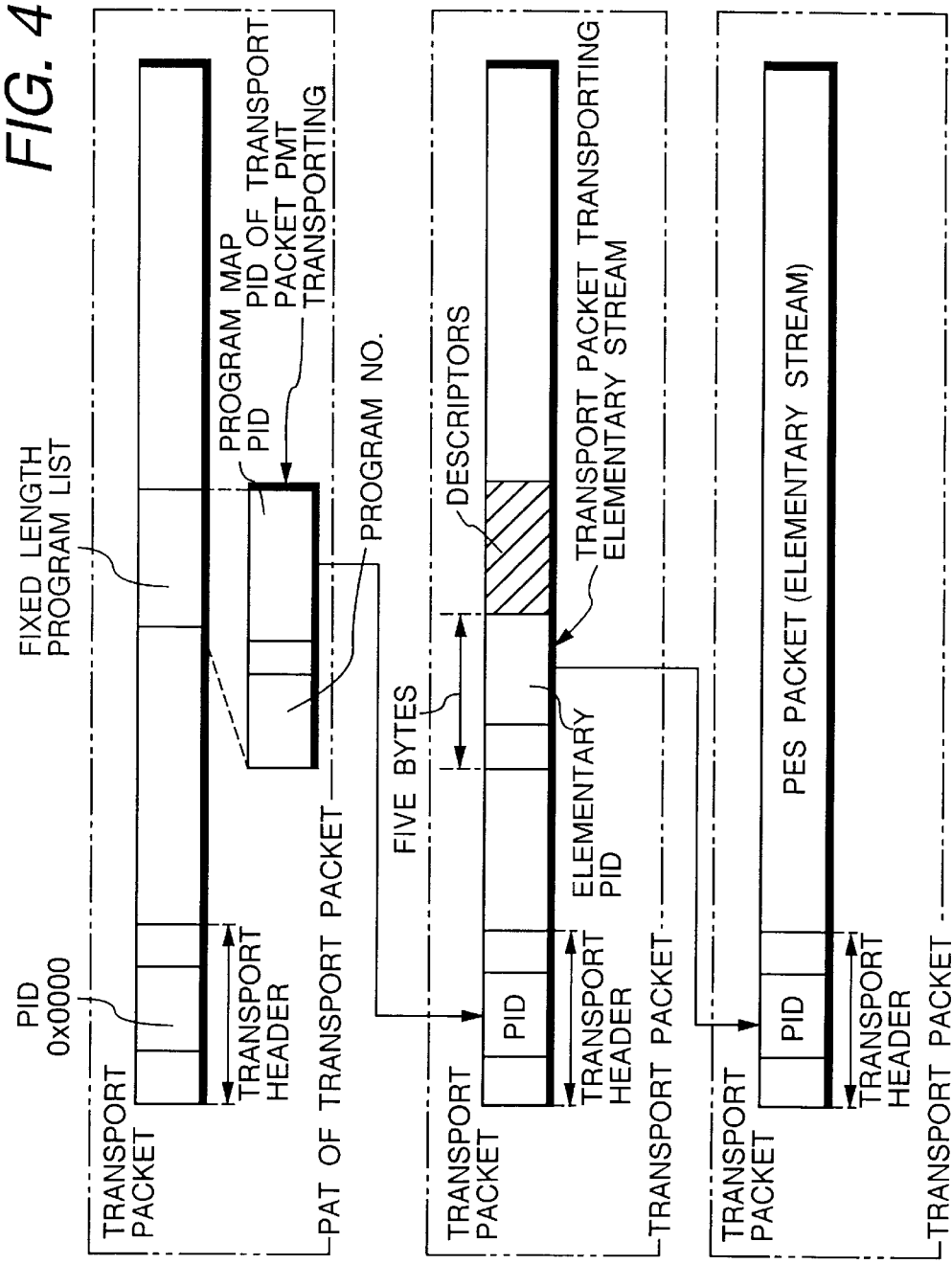

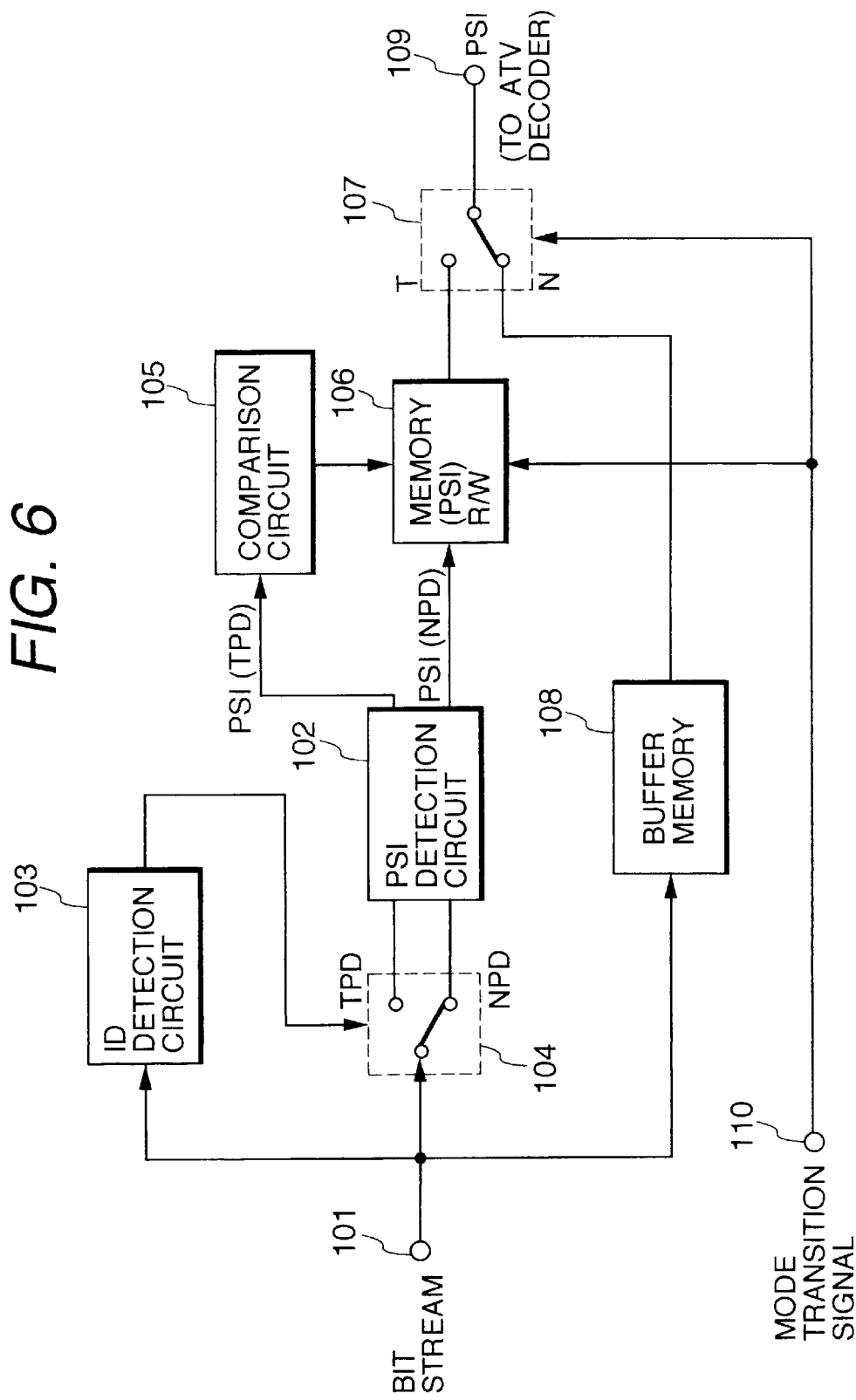

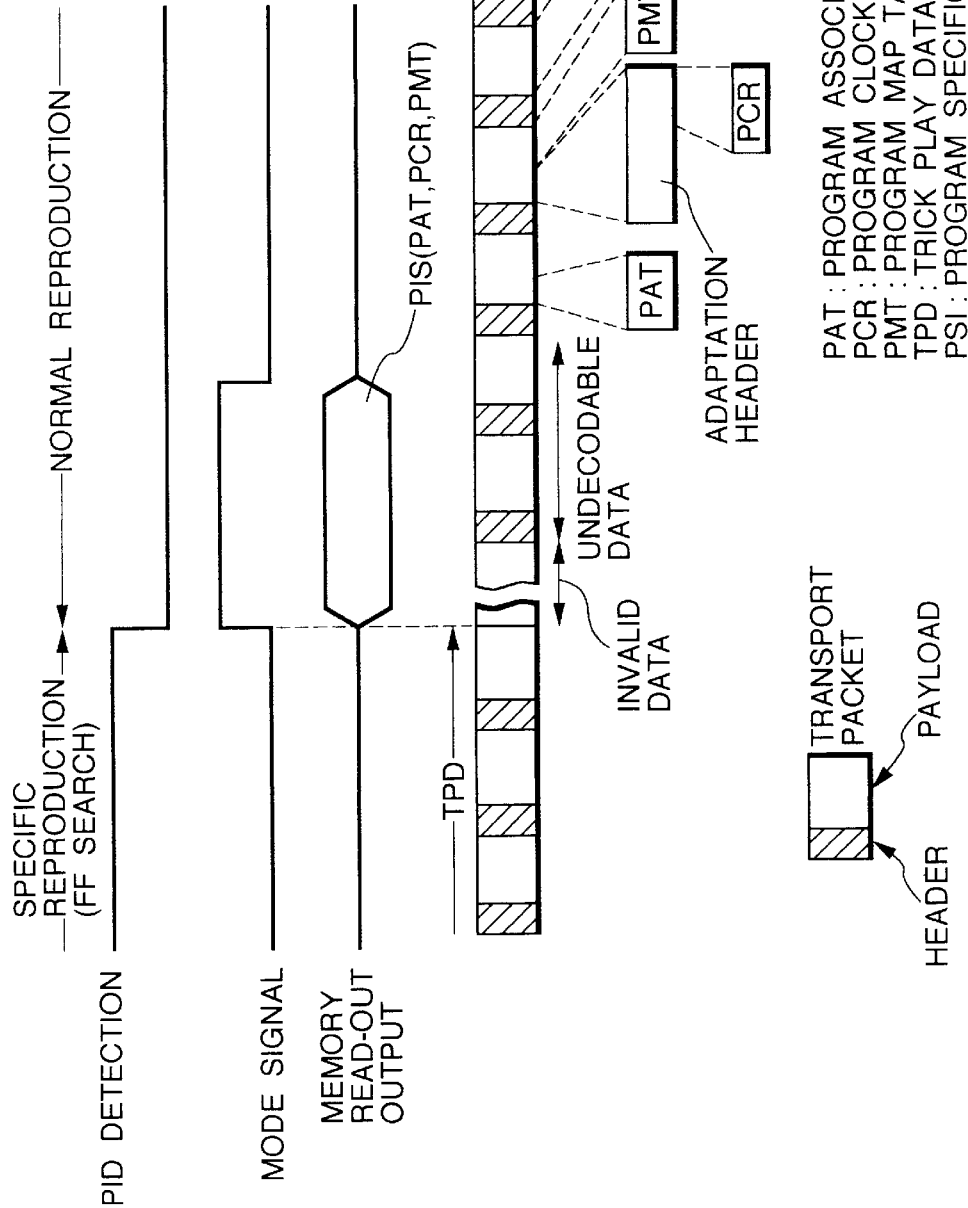

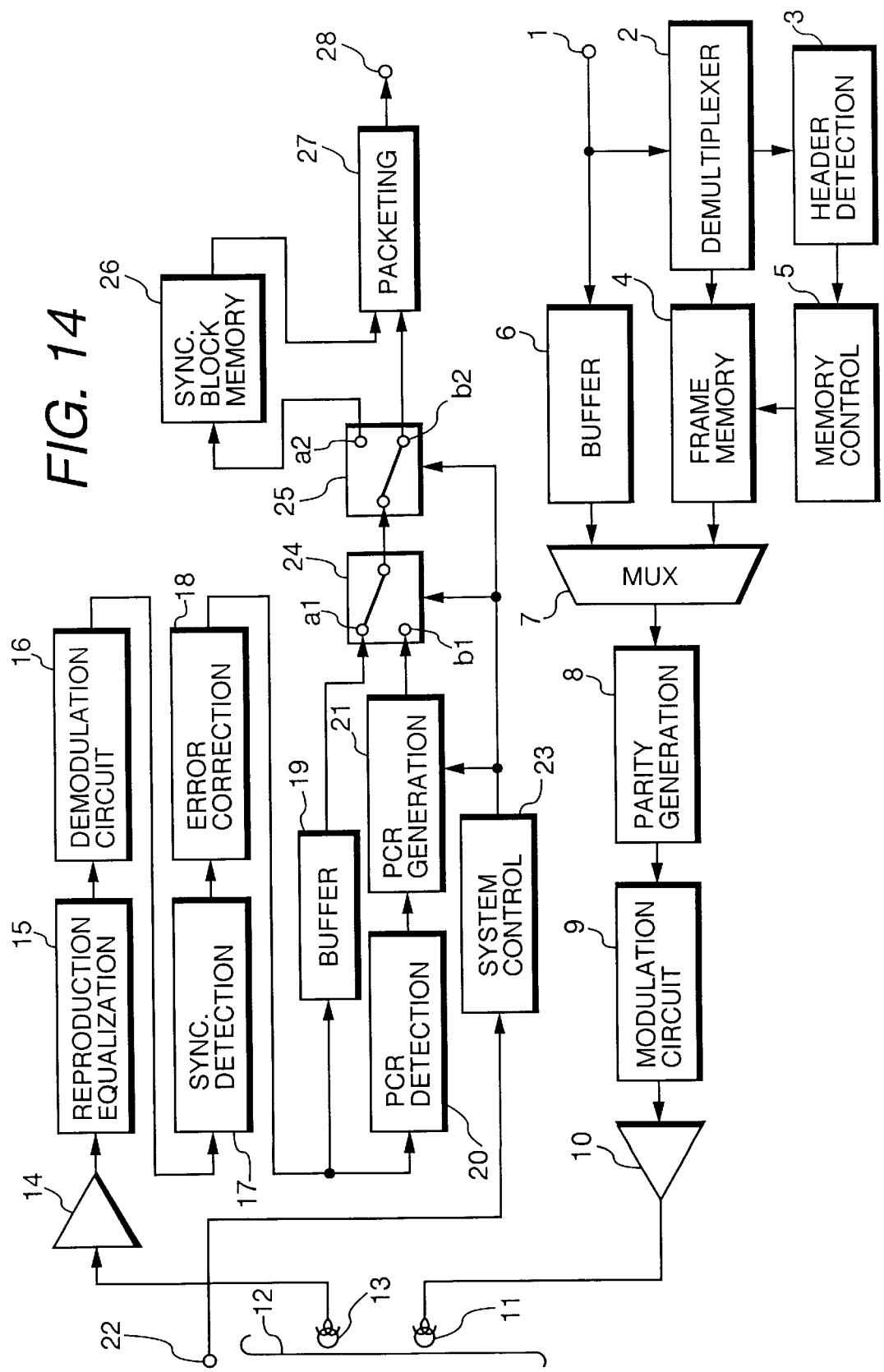

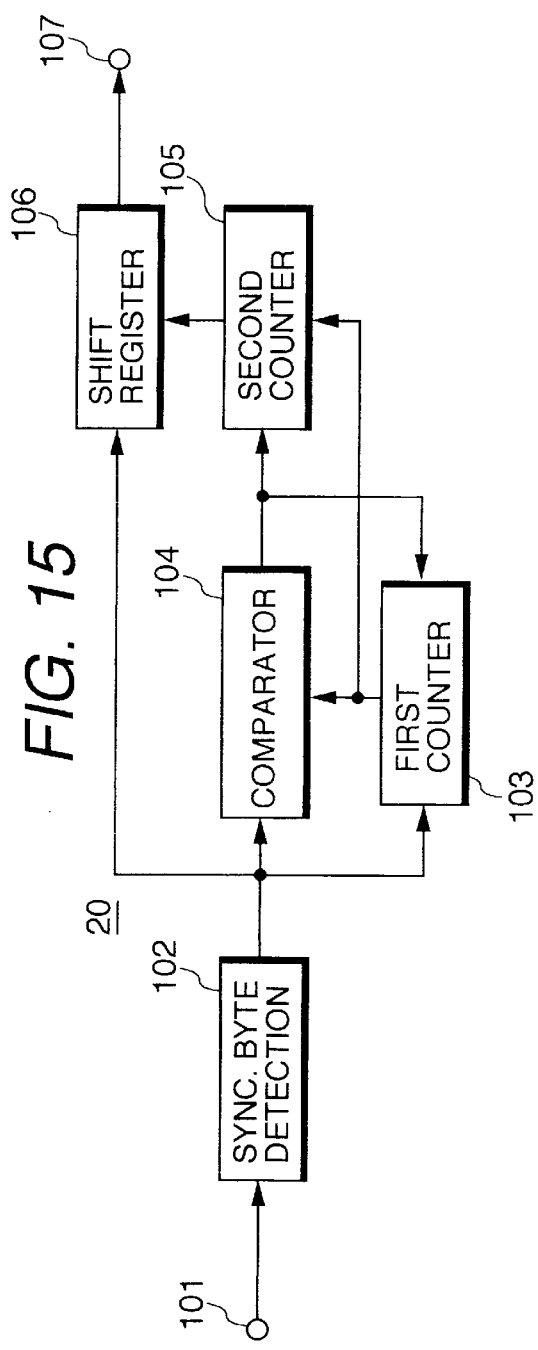
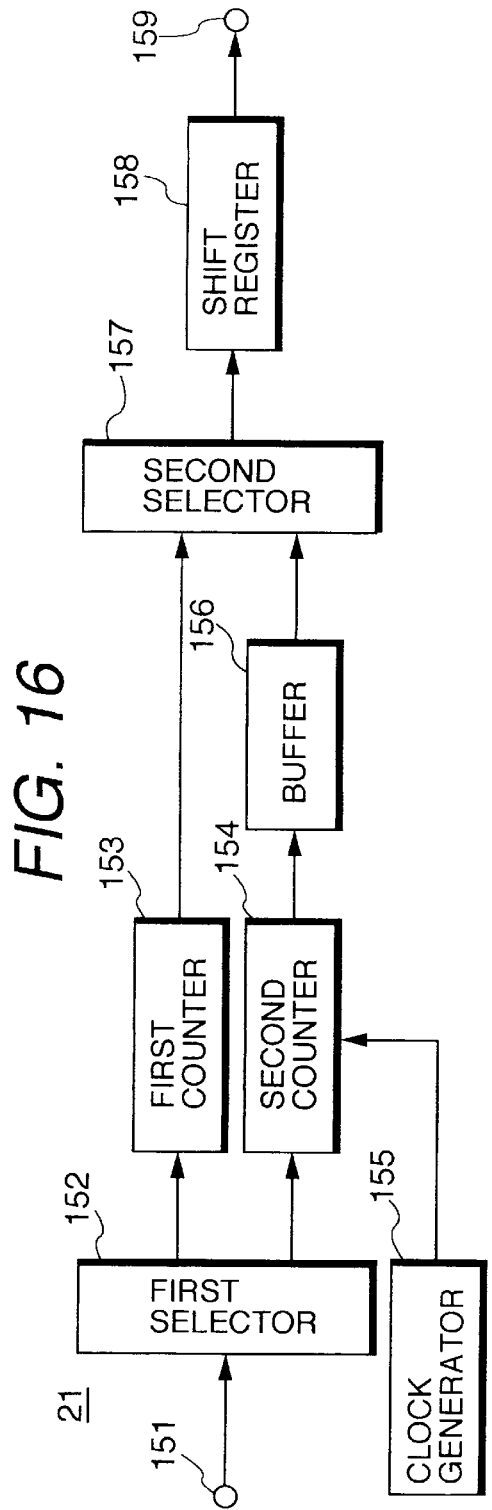

REPRODUCING APPARATUS FOR REPRODUCING SIGNALS FROM A RECORDING MEDIUM WHICH STORES NORMAL REPRODUCTION DATA AND SPECIFIC REPRODUCTION DATA

BACKGROUND OF THE INVENTION

1. Field of the Invention

The present invention relates to a recording/reproducing apparatus such as a digital video tape recorder (VTR) for recording/reproducing encoded data such as highly efficiently encoded image data.

2. Related Background Art

Digital processing of image data has been studied intensively. Many standardization methods for high efficiency encoding with image data compression have been proposed. High efficiency encoding technology encodes image data at a smaller bit rate in order to improve the efficiencies of digital transmission and recording. As such, high efficiency encoding schema, CCITT (Comito Consultafit International Telegraphique et Telephonique) has proposed Standardization Recommendation H.261 for Television Conferences/Picture Phones, JPEG (Joint Photographic Expert Group) scheme for color still images, and MPEG (Moving Picture Expert Group) for moving images. In the U.S.A., ATV (Advanced Television) using MPEG-2 scheme for a next generation TV broadcast system has been studied.

FIG. 1 is a diagram illustrating the MPEG coding system. In FIG. 1, arrows indicate the prediction direction in coding. FIG. 2 illustrates the order of image data in an encoding process, data disposed in a recording medium, a decoding process, and an image reproduction process, respectively of the MPEG coding system.

Referring to FIG. 1, in the MPEG coding system, a GOP (group of pictures) is constituted by a predetermined number of frame images. A GOP has at least one intra-frame encoded image I which is one-frame-image data encoded by DCT (Discrete Cosine Transform). One-frame image data at every a-th frames from the intra-frame encoded image I is converted into forward prediction encoded images $P_1$ and $P_2$. The forward prediction encoded image $P_2$ is converted from the forward prediction encoded image $P_1$. Each frame image data among the intra-frame encoded image I, first forward prediction encoded image $P_1$, and second prediction encoded image $P_2$ is converted into a forward/backward prediction encoded image obtained through forward/backward prediction encoding using the forward/backward image data.

As shown in FIGS. 1 and 2, first, the intra-frame image I is encoded. The intra-frame image I is encoded by using only information contained in one frame, and does not contain prediction in a time axis. Next, the forward prediction encoded image P is formed, and after the intra-frame encoded image I or forward prediction encoded image P is formed, an encoding process for the forward/backward prediction image B is performed. The forward prediction encoded image P and forward/backward prediction encoded image B use correlation with other image data. Because of the different prediction methods for respective image data described above, the forward/backward prediction encoded image B is recorded on a recording medium after the intra-frame encoded image I or forward prediction encoded image P, and it is moved to the original position when decoding.

Since the intra-frame image I is encoded only by the information in one frame, it can be decoded only by independent encoded data. On the other hand, the forward prediction encoded image P and forward/backward prediction encoded image B are decoded by using correlation with other image data, and cannot be decoded only by their independent encoded data.

In the MPEG coding system, although the record rate is stipulated (standard 1.2 Mbps), the data length is variable. Therefore, it is not possible to identify on what position the intra-frame encoded image I contained in GOP is recorded, nor to identify the data length of one GOP. If the MPEG coding system is applied to a digital VTR or other apparatuses, there is no problem in a normal reproduction mode because the encoded images I, B, and P are sequentially reproduced.

However, in a specific reproduction mode such as fast reproduction for a search, each encoded image I, B, P is not necessarily reproduced in a sequential order. Also in the specific reproduction mode, only part of a record track of a recording medium is reproduced and the position of the intra-frame encoded image I on the recording medium cannot be identified. Therefore, the intra-frame encoded image P cannot be always reproduced. In this case, the forward prediction encoded image P and forward/backward prediction encoded image B cannot be reproduced. A technique for solving this problem has been disclosed wherein encoded image data is recorded on a recording medium at the position allowing the reproduction thereof during the specific reproduction mode, and the encoded image data at that position is reproduced in the specific reproduction mode to obtain a frame image.

In the MPEG-2 coding system, coded image signals; voice signals, or other bit trains are called an elementary stream. A PES (Packetized Elementary Stream) packet for the unit structure of transforming the elementary stream is defined by the MPEG-2 coding system. This structure has a PES payload followed by PES header information. In the MPEG-2 coding system, a collection of elementary streams having a common time base is called a program.

In the MPEG-2 coding system, two formats are defined, one being a transport stream and the other being a program stream. Data necessary and sufficient for decode/reproduction synchronizations of images and voices are contained in both the definitions of the transport stream and program stream. The program stream is one or more PES packets having a common time base, and integrated into a single bit train.

The transport stream is one or more independent programs combined into a single bit train, and each program can have an independent time base. In the ATV system, the transport stream is used.

In the decoding system of the MPEG-2 coding system, synchronization is ensured by using an SCR (System Clock Reference) for the program stream and a PCR (Program Clock Reference) for the transport stream.

FIG. 3 is a block diagram showing an example of a decoder circuit for SCR or PCR. In FIG. 3, reference numeral 1 represents an input terminal, reference numeral 2 represents a substractor, reference numeral 3 represents a LPF (Low Pass Filter), reference numeral 4 represents an amplifier, reference numeral 5 represents a VCO (Voltage Controlled Oscillator), reference numeral 6 represents a counter, and a reference numeral 7 represents an output terminal.

The operation of this circuit will be described.

An output of the counter 6 is called an STC (System Time Clock). An SCR or PCR applied to the input terminal 1 of this decoder circuit is compared with the current STC outputted from the counter 6 at the subtractor 2. The comparison value passes through LPF 3 and the amplifier 4 which outputs it as a control signal of VCO 5. VCO 5 outputs a clock signal which changes its frequency in accordance with the control signal.

An output signal of VCO 5 at the output terminal 7 is used as a system clock and inputted to an MPEG decoder (not shown) and to the counter 6. The counter 6 counts this system clock to supply a new STC to the subtractor 2 to thereby constitute a feedback loop or a PLL (Phase Locked Loop). A time interval of SCR or PCR inputted to PLL is set to 700 msec or shorter for SCR and 100 msec or shorter for PCR.

In the ATV system, PCR is used for synchronization similar to the decoder circuit. In the case of a transport stream of the MPEG-2 coding system, image data, voice data, and other data are divided into a fixed length transmission unit called a transport packet and transported as a bit stream. This bit stream is added with PCR and other identifier information called a PSI (Program Specific Information) when necessary, and the decoder circuit detects and reproduces this PSI to initialize the decoder and correctly decode the bit stream.

PSI contains information for discriminating PIDs (Packet IDs) called a PAT (Program Association Table) and a PMT (Program Map Table). By using this information, a transport packet having target data is discriminated.

In transitting the specific reproduction mode of a VTR to the normal reproduction mode, it is necessary to again initialize the decoder circuit by using PCR and PSI for the normal reproduction different from PCR and PSI for the specific reproduction, because the image data for the normal and specific reproductions are independently and time sequentially written on the recording medium. Furthermore, since PCR becomes discontinuous between the normal and specific reproductions, it is necessary to set the discontinuity indication in the header of the packet to "1" to inform the decoder circuit of the PCR discontinuity.

FIG. 4 illustrates the procedure of decoding a bit stream in the ATV system. As shown in FIG. 4, a transport packet recorded with PAT, i.e., a transport packet having PID of 0×0000 recorded in the transport header is detected from the bit stream of the ATV system. PAT is picked up from the payload of the transport packet having PID of 0×0000, and a program map PID is read from this PAT. The program map PID is a PID of a transport packet in which a PID (elementary PID) of the transport packet containing a program to be decoded is described.

Next, a transport packet having the same PID as the program map PID is detected. A PMT is picked up from the payload of the detected transport packet. From this PMT, an elementary PID is read which is a PID of the transport packet recorded with the desired program. A transport packet having the same PID as the elementary PID is detected. The desired program is read from the payload of the transport packet having the PID same as the elementary PID.

In the conventional technologies described above, in transitting from the specific reproduction mode such as a forward search to the normal reproduction mode, it is impossible for an ATV decoder to decode a bit stream correctly until VTR reproduces PSI of the normal reproduction.

FIG. 5 illustrates an example a bit train reproduced from a recording medium in the unit of transport packet. Packets with hatched lines are those for the normal reproduction, and the other packets are those for the specific reproduction. During the normal reproduction, PES and PSI packets for the normal reproduction (1) and PES and PSI packets for the specific reproduction are reproduced. When a mode transition signal for the transition from the normal reproduction mode to the specific reproduction mode such as a search is given at the timing indicated by an arrow in FIG. 5, the transport system of the recording medium starts transitting to the specific reproduction mode, and enters a data reproduction disabled state as indicated at (2) until data are stabilized. After the state is stabilized, the data for specific reproduction starts being reproduced. However, in this case, the decoder cannot discriminate the PES packet for specific reproduction until the PSI packet for specific reproduction indicated at (4) is reproduced. Therefore, the reproduction is possible only from the packet indicated at (5), and the data decoding disabled period indicated at (3) is generated so that a reproduced image is disturbed or lost.

The time period from when the specific reproduction such as a forward search transits to the normal reproduction mode to when PSI is first detected, is not necessarily constant. In transitting to the normal reproduction mode after the search end, the time period (transition time) from a search screen to a normal reproduction screen is not constant depending upon the transition timing, and during this time period, the image is disturbed or lost.

Since the MPEG coding system or ATV system uses PCR or SCR for synchronization, it is necessary to continuously input PCR or SCR to the decoder. However, in the case of the above-described recording/reproducing apparatus, during the transition period from the normal reproduction to specific reproduction or vice versa, PCR or SCR cannot be inputted to the decoder so that the operation of the decoder is delayed.

SUMMARY OF THE INVENTION

It is an object of the present invention to eliminate the above-described disadvantages generated during a mode transition of a VTR which records a bit stream of the ATV system, i.e., during a transition from a normal reproduction mode to a specific reproduction mode, or vice versa.

In one embodiment of the invention, a recording/reproducing apparatus for recording encoded data on a recording medium by time sequentially and independently recording normal reproduction data and specific reproduction data contained in the encoded data, the normal reproduction data and specific reproduction data including decode control information, comprises: detection means for detecting the decode control information from reproduced data in a specific reproduction mode and in a normal reproduction mode; and memory means for storing the decode control information detected by the detection means.

The apparatus further comprises update means for updating the contents of the memory means by the latest one of the reproduced decode control information.

The apparatus further comprises means for detecting program identification information, means for storing the detected program identification information, and means for detecting the program identification information during the specific reproduction mode and clearing the contents of the memory means.

In this embodiment, the decode control information is detected and stored during normal and specific reproductions. The decode control information is used upon a mode transition so that the period while the decoder for decoding reproduced encoded data is undecodable can be shortened.

Further, the memory means for storing the decode control information is updated by the latest decode control information to thereby avoid an erroneous operation of the decoder.

Still further, the program identification information is detected from reproduced data and stored. A change in the program identification information is detected during the specific reproduction mode and the contents of the memory means are cleared. Therefore, during the transition from specific reproduction to normal reproduction, erroneous control information can be prevented from being inserted into reproduced encoded data, and a malfunction of the decoder can be avoided.

In another embodiment of the invention, a recording/reproducing apparatus for recording/reproducing encoded data including normal reproduction data and specific reproduction data respectively containing identification information and for time sequentially and independently recording the normal reproduction data and specific reproduction data on a recording medium, comprises: detection means for detecting the identification information contained in the specific reproduction data and reproduced in a normal reproduction mode; and memory means for storing the identification information detected by the detection means.

In this embodiment, when the normal reproduction mode transits to the specific reproduction mode, a signal indicating a discontinuity of the time signal is embedded in the reproduced encoded data.

The recording/reproducing apparatus further comprises time signal generation means for generating a signal having the same format as the time signal contained in the reproduced encoded data, and control means for controlling to embed the signal in the reproduced encoded data.

In this embodiment, the identification information of the specific reproduction data is detected during normal reproduction and stored to use it upon a mode transition. Therefore, the period while the decoder for decoding reproduced encoded data is undecodable can be shortened.

Specifically, in this embodiment, PSI for specific reproduction indicated at (1) in FIG. 5 is stored during the normal reproduction. When the mode transits from the normal reproduction mode to the specific reproduction mode such as a search, PSI of specific production data is outputted so that the decoder can recognize at once the packet for the specific reproduction and can decode the packet indicated at (3) in FIG. 5. The undecodable period of the decoder can thus be shortened.

Further, when the mode transits from the normal reproduction to the specific reproduction, the malfunction of the decoder can be avoided by embedding a signal indicating a discontinuity of the time signal in the reproduced encoded data.

Still further, the time signal in the encoded data reproduced by the time signal generation means is stored. When the mode transits from the normal reproduction to the specific reproduction, a time signal having a continuity is generated in accordance with the stored time signal, and embedded in the reproduced encoded data to thereby avoid a malfunction of the decoder.

In still another embodiment of the invention, a recording/reproducing apparatus comprises: encoded data reconfiguration means for receiving encoded data formed by multiplexing intra-frame encoded image data and inter-frame encoded image data and for selecting the intra-frame encoded image data from the received encoded data and reconfiguring the intra-frame encoded image data; record means for recording an output of the encoded data reconfiguration means on a recording medium at a predetermined position; reproduction means for reproducing and outputting data recorded on the recording medium by the record means, at a predetermined increased speed; sync signal generation means for generating a sync signal in accordance with a time signal contained in an output of the reproduction means; time signal generation means for generating a signal having the same format as the format of the time signal contained in an output of the reproduction means; and memory means for storing one or both of outputs of the reproduction means and the time signal generation means.

In this embodiment, the encoded data reconfiguration means extracts low frequency components of the encoded data to reconfigure the intra-frame encoded image data.

Further, the time signal generation means generates the time signal during a transition period between the operation of the reproduction means at a normal speed and the operation of the reproduction means at a predetermined increased speed.

Still further, the memory means stores an output of the reproduction means and an output of the time signal generation means during a transition period between the operation of the reproduction means at a normal speed and the operation of the reproduction means at a predetermined increased speed.

In this embodiment, the reconfiguration means reconfigures the intra-frame encoded data, and the record means records the reconfigured encoded data on the recording medium at positions where the reproduction means can reproduce at a predetermined increased speed.

The reproduction means reproduces the encoded data on the recording medium at the predetermined increased speed, and the sync signal generation means generates a sync signal for reproduction in accordance with the time signal recorded on the recording medium.

The memory means stores one or both of the outputs of the reproduction means and the time signal generation means.

The time signal generation means generates a time signal allowing the sync signal generation means to continuously generate the sync signal, if the reproduction means changes the reproduction speed.

If the memory means stores an output of the reproduction means, the time signal generation means generates a time signal allowing the sync signal generation means to continuously generate the sync signal, in accordance with the time signal contained in the output of the reproduction means.

If the memory means stores an output of the time signal generation means, the time signal generation means generates a time signal allowing the sync signal generation means to continuously generate the sync signal, in accordance with the time signal presently supplied to the sync signal generating means.

Further, when the encoded data reconfiguration means reconfigures the intra-frame encoded image data, the encoded data formed by time divisionally multiplexing the intra-frame encoded image data and inter-frame encoded image data is separated into the intra-frame encoded image data and inter-frame encoded image data. The intra-frame encoded image data is reconfigured by extracting the intra-frame encoded image data or by using both the intra-frame encoded image data and inter-frame encoded image data. The low frequency components of the reconfigured intra-frame encoded image data are extracted to generate new intra-frame encoded image data.

Still further, during the transition period of the reproduction means from the normal reproduction to the specific reproduction or vice versa, the time signal is not inputted and the sync signal is not generated. The time signal is obtained through interpolation of an output of the time signal generation means.

Furthermore, if the time signal is discontinuous, the memory means replaces the time signal contained in an output of the reproduction means or interpolates the time signal in an output of the reproduction means.

Other objects and advantages of the invention will become apparent from the following detailed description when read in conjunction with the accompanying drawings.

BRIEF DESCRIPTION OF THE DRAWINGS

FIG. 4 is a diagram illustrating a decoding process for an ATV bit stream.

FIG. 6 is a block diagram showing a first embodiment of the invention.

FIG. 7 is a timing chart illustrating the relationship between reading stored PSI and an ATV bit stream on the first embodiment.

FIG. 14 is a block diagram showing another embodiment of the invention.

FIG. 15 is a block diagram of the PCR detection circuit shown in FIG. 14.

FIG. 16 is a block diagram of the PCR generation circuit shown in FIG. 14.

DETAILED DESCRIPTION OF THE PREFERRED EMBODIMENTS

Figure 1:
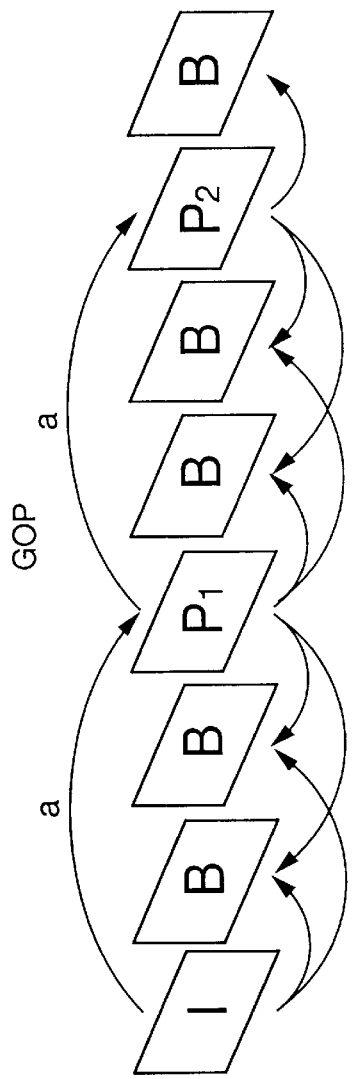
FIG. 1 is a diagram illustrating the MPEG coding system.
Figure 2:
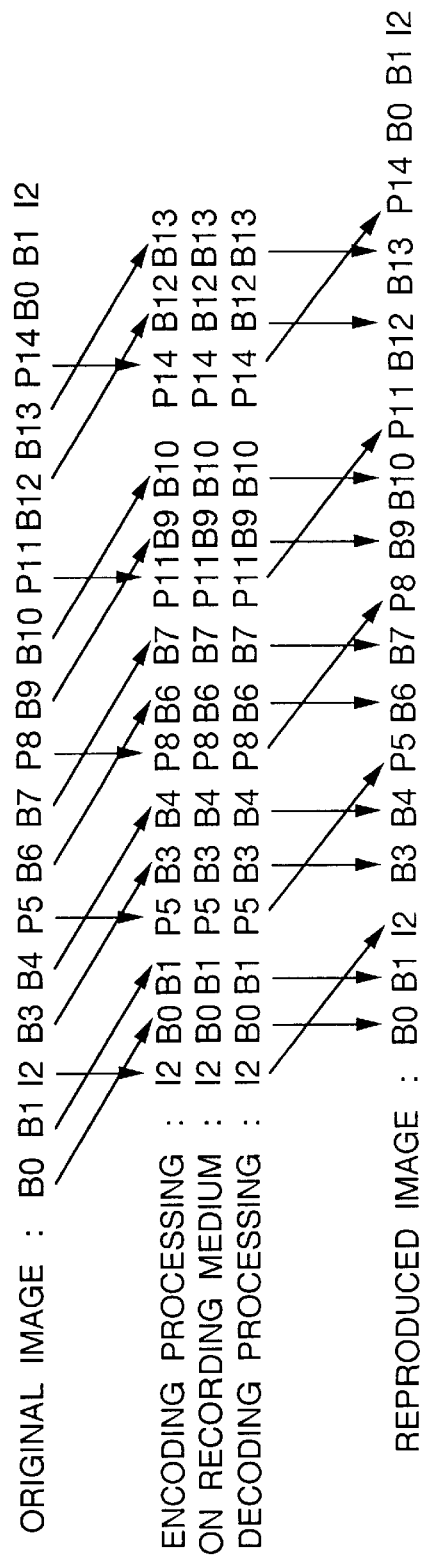
FIG. 2 is a diagram illustrating the procedure of encoding and decoding of the MPEG coding system.
Figure 3:
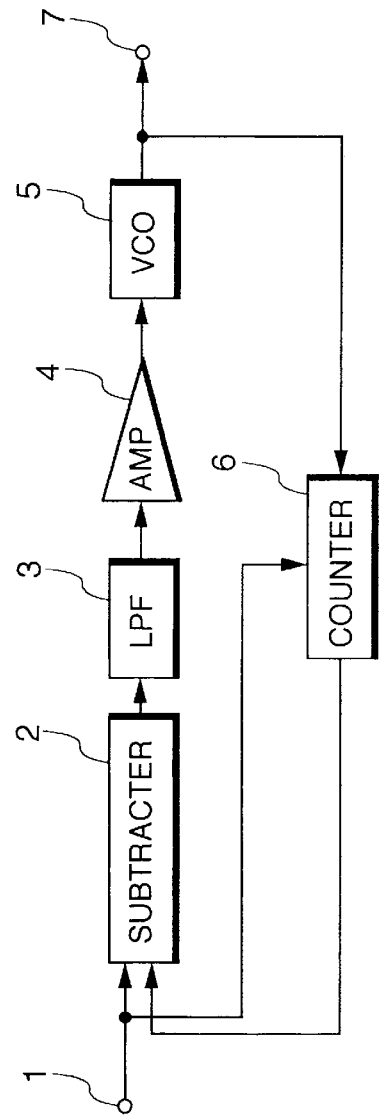
FIG. 3 is a block diagram showing an example of a convention decoder circuit for PCR (Program Clock Reference).
Figure 5:
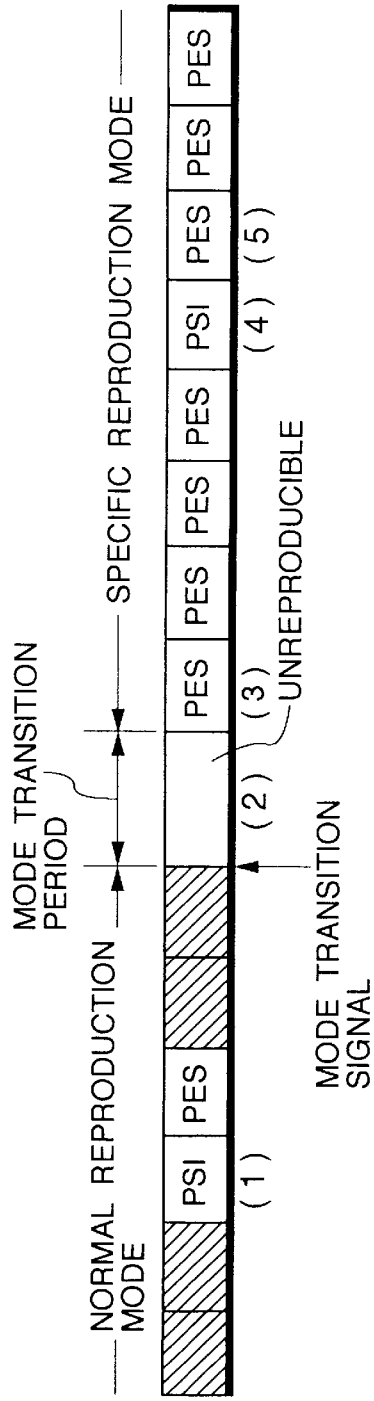
FIG. 5 is a diagram illustrating a decoding process during a mode transition.

FIG. 6 is a block diagram showing the first embodiment of the invention.

In FIG. 6, reference numeral 101 represents an input terminal for a bit stream reproduced by a VTR or the like. Reference numeral 110 represents an input terminal for a mode transition signal supplied from a VTR or the like. Reference numeral 102 represents a PSI detection circuit for detecting a PSI from a bit stream outputted from a switch 104 to be described below. Reference numeral 103 represents an ID detection circuit for detecting an ID (such as a sync block ID of a digital VTR) contained in a bit stream inputted from the input terminal 101, and for outputting a TPD/NPD identification signal by judging whether the bit stream is trick play data (TPD, specific reproduction mode) or normal reproduction data (NPD). Reference numeral 104 represents a switch for switching a bit stream inputted from the input terminal between two systems, in accordance with an identification signal outputted from the ID detection circuit 103.

Reference numeral 105 represents a comparison circuit for comparing PSI of the latest TPD with PSI in the TPD one TPD before the latest TPD, and outputting "1" (H level) when it detects a change in PSI. Reference numeral 106 represents a memory for holding PSI of the latest NPD. Reference numeral 107 represents a switch for switching between PSI of a bit stream and PSI held in the memory 106 in accordance with a mode transition signal from the input terminal 110. Reference numeral 108 represents a buffer memory, and reference numeral 109 represents an output terminal for an ATV bit stream.

The operation of this circuit will be described below.

Referring to FIG. 6, an ATV bit stream applied to the input terminal 101 is inputted to the ID detection circuit 103, buffer memory 108, and switch 104. The ID detection circuit 103 detects an ID (such as a sync block ID of a digital VTR) for identifying the data in the bit stream. If PID is for TPD, "1" is outputted as a control signal to the switch 104, and if PID is not for TPD, "0" (L level) is outputted. The switch 104 is controlled by the ID detection circuit 103, and outputs the bit stream to the TPD side if the output of the ID detection circuit 103 is "1" (TPD), and to the NPD side if the output of the circuit 103 is "0" (NPD).

The PSI detection circuit 102 has two detection circuits of TPD and NPD, and independently picks up a transport packet containing PSI from the TPD or NPD bit stream outputted from the switch 104, and outputs PSI for TPD to the comparison circuit 105, and PSI for NPD to the memory 106.

The comparison circuit 105 compares PSI of the previous TPD stored therein with the current PSI. If the current PSI is the same as the previous PSI, the stored PSI is held therein and "0" is outputted to the clear terminal of the memory 106. If different, the stored PSI of the previous TPD is replaced with the current PSI and "1" is outputted to the clear terminal of the memory 106 to clear the contents of the memory.

The memory 106 maintains a write mode until "1" is supplied from the mode transition signal terminal 110. The contents of the memory 106 are updated by PSI of NPD supplied from the switch 104 irrespective of the reproduction mode of VTR.

Next, as shown in the timing chart of FIG. 7, when the mode transition signal inputted from the input terminal 110 becomes "1", the switch 107 is changed to the T (transient) side and at the same time, the memory 106 is read and PSI is read. The read PSI is outputted via the switch 107 from the output terminal 109. Reproduction is performed while the switch 107 is closed to the T side. In other words, the bit stream inputted from the input terminal 101 is invalid data during the mode transition period of a VTR or the like, or undecodable data because PSI is not reproduced after the mode transition.

The switch 107 is normally closed to the N (normal) side if the input from the input terminal 110 is "0" (mode other than specific reproduction). In this case, the bit stream inputted from the input terminal is outputted only via the buffer memory 108 from the output terminal 109.

Figure 8:
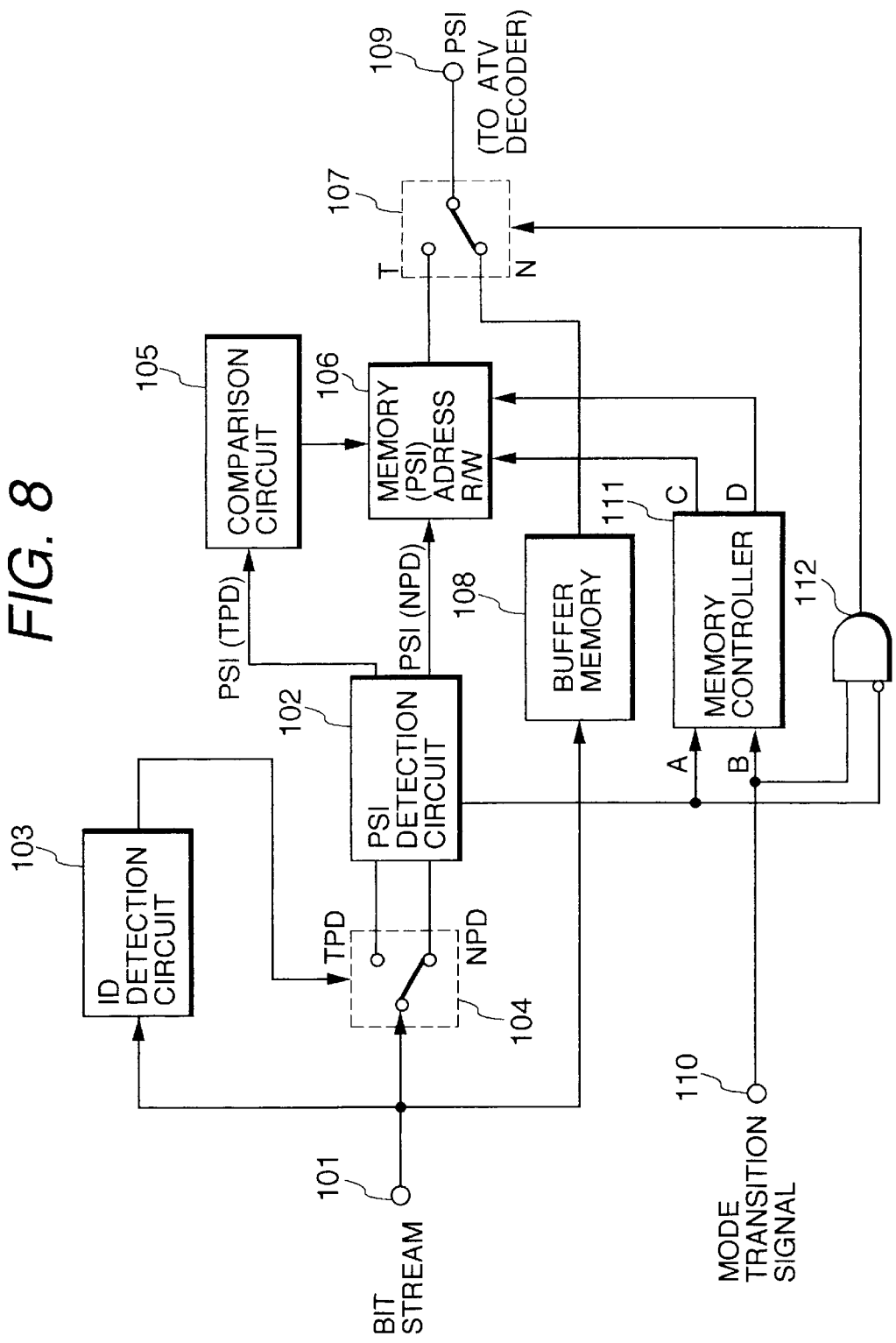
FIG. 8 is a block diagram showing a second embodiment of the invention.

FIG. 8 is a block diagram showing the second embodiment of the invention. Like elements to those shown in FIG. 6 are represented by using identical reference numerals, and the description of structure and operation thereof is omitted.

Referring to FIG. 8, reference numeral 111 represents a memory controller for controlling the read/write (R/W) and read/write address of the memory 106. Reference numeral 112 represents a logic circuit in which a NOT gate is connected to one input of a two-input AND gate.

The operation of this circuit will be described below.

The whole operation of the memory 106 is controlled by the memory controller 111. The memory controller 111 outputs a mode control signal (D) for read (R) and write (W) operations and a read/write address (C) as shown in Table 1, in accordance with a PSI detection signal (A) from the PSI detection circuit 102 and a mode transition signal (B) from the input terminal 110.

TABLE 1

| A | B | C | D | Switch 107 |
|---|---|---|---|---|
| H | H | Write Address | L(W) | Normal Reproduction (L) |
| H | L | Write Address | L(W) | Normal Reproduction (L) |
| L | H | Read Address | H(R) | Mode Transition (H) |
| L | L | Read Address | H(R) | Normal Reproduction (L) |

W: write
R: read

The switch 107 is controlled by a logical product of a negate of the PSI detection signal (A) outputted from the PSI 102 to the logical circuit 112 and the mode transition signal (B) inputted from the input terminal 110. As shown in Table 1, if the PSI detection signal outputted from the PSI detection circuit 102 is "0" (PSI not detected) and the mode transition signal supplied from the input terminal 110 is "1" (mode transition state of VTR or the like), then the switch 107 is turned to the T side and at the same time, the memory 106 starts being read and the read data is outputted via the switch 107 from the output terminal 109.

During the period while the switch 107 is turned to the T side, reproduction is effective. Namely, the bit stream inputted from the input terminal 101 is invalid data during the mode transition period of a VTR or the like, or undecodable data because PSI is not reproduced after the mode transition.

Figure 9:
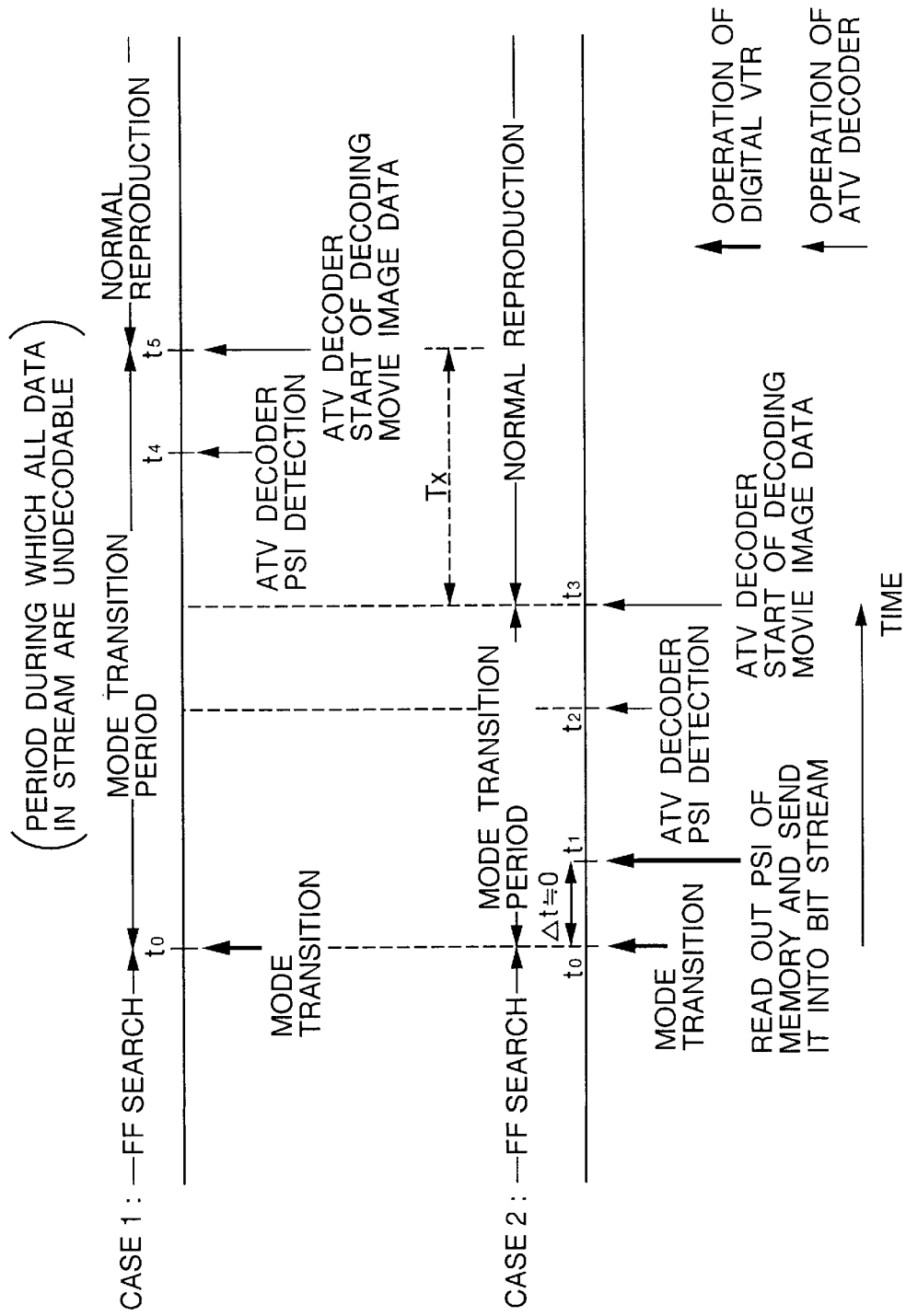
FIG. 9 is a timing chart illustrating a transition period from a specific reproduction (forward search) to a normal reproduction according to the invention.

FIG. 9 is a timing chart illustrating the operations of the invention and the conventional technique. Case 1 represents the operation of the conventional technique, and Case 2 represents the operation of the invention.

In Case 1, after a change request at timing $t_0$ for changing from a specific reproduction (in this case, fast forward FF search) to a normal reproduction, an ATV decoder detects PSI of the first NPD at timing $t_4$. In response to this detection, the ATV decoder starts decoding at timing $t_5$ to obtain an image of the normal reproduction. The time period required for the mode transition is a period from $t_0$ to $t_5$. The timing $t_4$ when PSI is detected may differ, and the time period is not constant.

In contrast, in Case 2, after a mode change request at timing $t_0$, PSI for NPD previously detected and stored is read and added to the bit stream at timing $t_1$. Therefore, the ATV decoder detects PSI at timing $t_2$, and decoding starts at timing $t_3$ to obtain an image of the normal reproduction.

The period while an image is disturbed or lost can be shortened by $T_x$ more in Case 2 than in Case 1, and the period from $t_0$ to $t_3$ can be made generally constant.

According to the embodiments described above, a transport packet containing PSI for the normal reproduction data is cut from the reproduced bit stream and stored in the memory. The contents of the memory are always updated by PSIs for normal reproduction data reproduced during the normal or specific reproduction modes. During the transition period during which PSI recorded in the recording medium such as a magnetic tape is reproduced after the transition from the forward search to the normal reproduction, PSI stored in the memory is embedded as a temporary PSI in the bit stream.

With the above arrangement, an undecodable bit stream during the period from the normal reproduction to PSI reproduction can be changed to a decodable bit stream, shortening the mode transition time period.

Furthermore, if the program ID (PID) of normal reproduction data changes during the forward search to the program having a different program ID, the contents of the memory are cleared when this PID change is detected. Accordingly, built-in of an improper PSI into a bit stream, i.e., erroneous operation of an ATV decoder, can be avoided when the mode changes from the forward search to the normal reproduction.

In the embodiments described above, control information is detected and stored during the normal reproduction and specific reproduction. Therefore, by using the control information stored during the mode transition, a decoder for decoding encoded data can shorten an undecodable time and reduce disturbance and loss of images.

Further, the contents of the memory are updated by newest control information so that a malfunction of the decoder can be avoided.

Still further, program identification information is detected from encoded data and stored in the memory. The contents of the memory are cleared when a change in the program identification information is detected during the specific reproduction mode. Accordingly, in transitting from the specific reproduction to the normal reproduction, erroneous identification information can be prevented from being inserted into encoded data and a malfunction of the decoder can be avoided.

Figure 10:
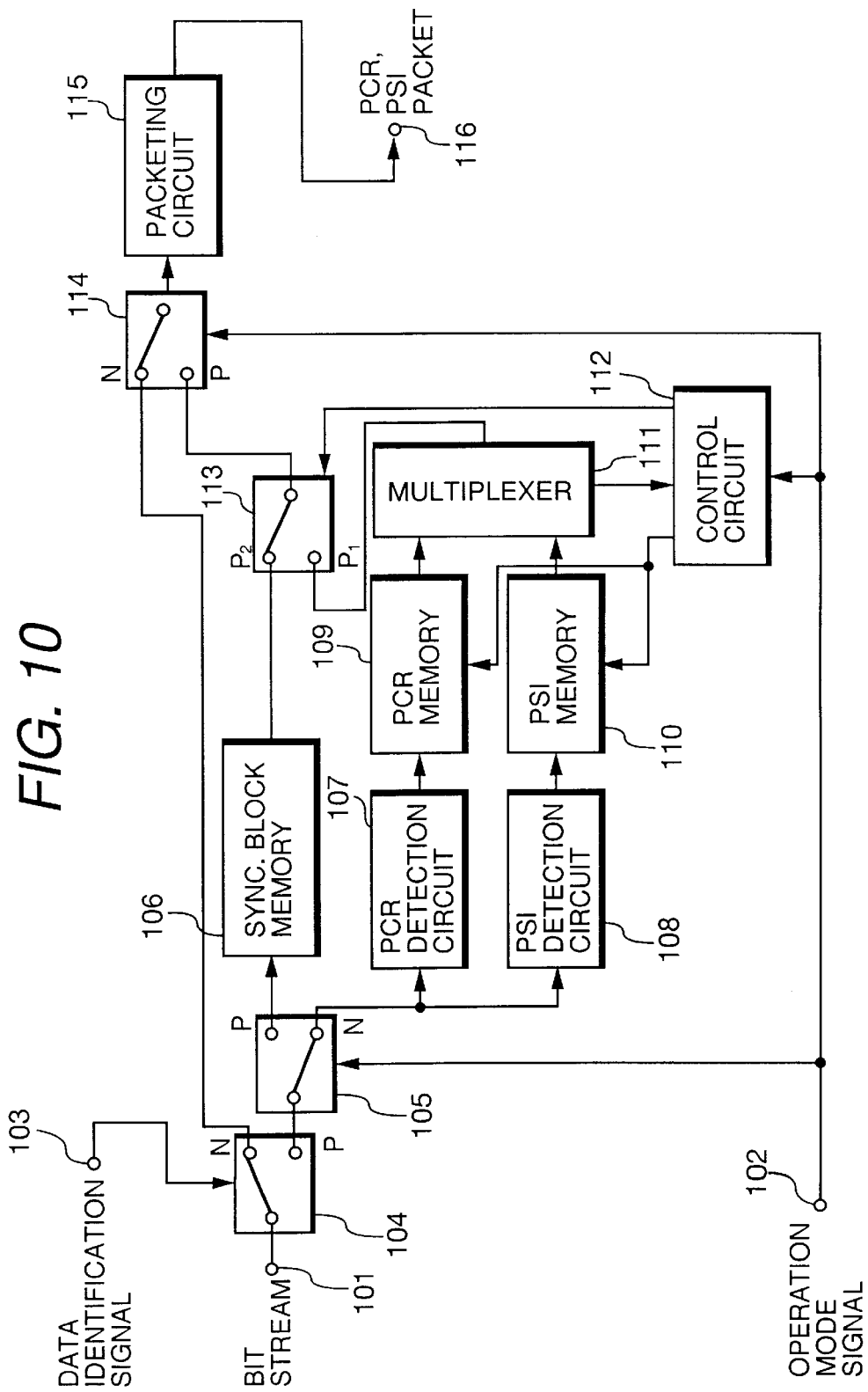
FIG. 10 is a block diagram showing the structure of a third embodiment of the invention.

Next, another embodiment will be described. FIG. 10 is a block diagram showing the third embodiment of the invention. In this embodiment, the invention is applied to a recording/reproducing apparatus for the record/reproduction of an MPEG transport stream or an ATV bit stream. In FIG. 10, reference numeral 101 represents an input terminal for reproduction data, reference numeral 102 represents an input terminal for an operation mode signal, reference numeral 103 represents an input terminal for a data identification signal, reference numerals 104 and 105 represent selection switches, reference numeral 106 represents a sync block memory, reference numeral 107 represents a PCR detection circuit, reference numeral 108 represents a PSI detection circuit, reference numeral 109 represents a PCR memory, reference numeral 110 represents a PSI memory, reference numeral 111 represents a multiplexer, reference numeral 112 represents a control circuit, reference numerals 113 and 114 represent select switches, and reference numeral 115 represents an output terminal.

The operation of this circuit will be described below.

A bit stream signal inputted from the input terminal 101 is supplied to the select switch 104. A data identification signal is inputted to the input terminal 103, the data identification signal indicating whether the reproduction data is normal reproduction data or specific reproduction data. The selection switch 104 is controlled by the data identification signal from the input terminal 103, and selects the N side if the input data is for normal reproduction, and the P side if the input data is for specific reproduction.

If the input data is for specific reproduction, the input data is supplied to the select switch 105. The select switch 105 is controlled by the operation mode signal inputted from the input terminal 102, and selects the P side if the operation mode is the specific reproduction mode, and the N side if the operation mode is the normal reproduction mode. In the case of the specific reproduction mode, the input data is supplied to the sync block memory 106 and reconfigured as one-frame data. In the case of the normal reproduction mode, the input data is supplied to the PCR detection circuit 107 and PSI detection circuit 108 to detect PCR and PSI and store them in the PCR memory 109 and PSI memory 110, respectively.

Figure 11:
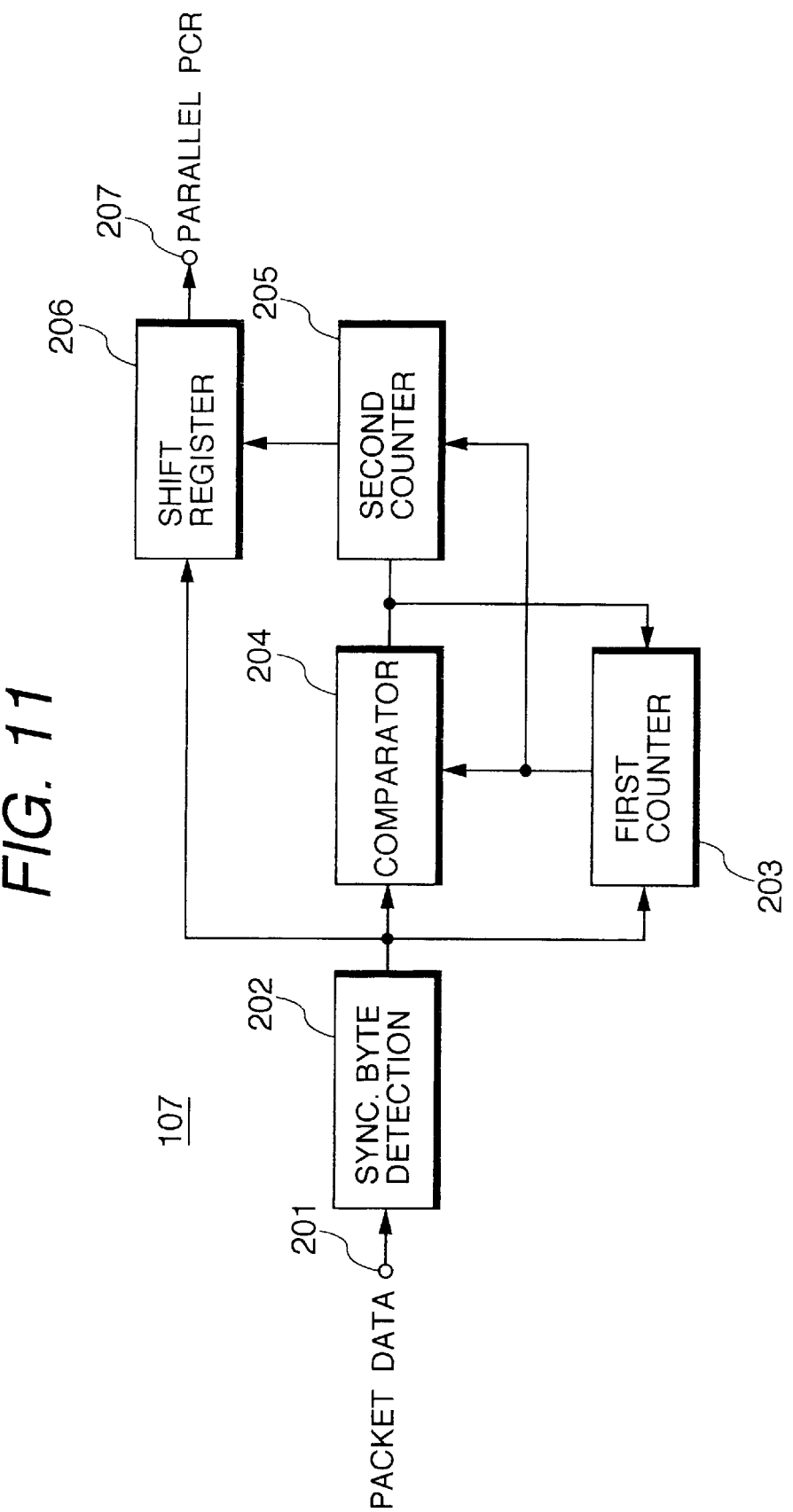
FIG. 11 is a block diagram showing an example of the structure of the PCR detection circuit of the third embodiment.

The PCR detection circuit 107 is configured such as shown in FIG. 11. In FIG. 11, reference numeral 201 represents an input terminal, reference numeral 202 represents a sync byte detection circuit, reference numeral 203 represents a first counter, reference numeral 204 represents a comparator, reference numeral 205 represents a second counter, reference numeral 206 represents a shift register, and reference numeral 207 represents an output terminal. Packet data inputted from the input terminal 201 is supplied to the sync byte detection circuit 202 to detect an 8-bit sync byte contained in the packet data for the synchronization with the packet and other data. After the establishment of the synchronization with the packet and other data, the packet data is supplied to the first counter 203, comparator 204, and shift register 206.

The first counter 203 counts the number of bits of the packet. Namely, the first counter 203 resets the count in response to the data detected by the sync byte detection circuit 202, and starts counting from the bit next to the last bit of the sync byte. When the count of the first counter 203 reaches 19 bits, it outputs a comparison permission signal to the comparator 204. The bit of this signal is the first bit in adaptation field control. If this bit is "1", an adaptation field which possibly contains PCR is contained in the same packet. The comparator 204 compares the bit with "1". If the bit is "1", it instructs the first counter 203 to continue counting bits. If the bit is "0", the comparator 204 instructs the first counter 203 to stop its counting operation and wait for the next packet input.

When the count reaches 36 bits, the first counter 203 outputs a comparison permission signal to the comparator 204. The bit of this signal is a PCR flag. If this bit is "1", PCR is present in the adaptation field of the same packet. The comparator 204 compares the PCR flag with "1", it instructs the first counter 203 to continue counting bits if the flag is "1", and it instructs the first counter 203 to stop its counting operation and wait for the next packet input if the flag is "0". When the count reaches 40 bits, the first counter 203 allows the second counter 205 to count bits. The second counter 205 then counts the data field of PCR.

The second counter 205 counts the bits of PCR. The shift register 206 converts PCR from serial data into parallel data under the control of the second counter 205, and outputs the parallel data from the output terminal 207. PCR is extracted from the packet data as timing data by the second counter 205 and shift register 206. PCR has a bit field of 42 bits and is divided into two parts, one being a 33-bit part called a PCR base and the other being an 8-bit part called a PCR extension. An 8-bit field reserved by MPEO is being inserted between the PCR base and PCR extension.

The second counter 205 left-shifts the data inputted to the shift register 206 until the count reaches 33 bits in order to extract the PCR base. When the count reaches 33 bits, the data in the shift register 206 is outputted from the output terminal 207 as 33-bit parallel data. The following 8-bit data is invalid data so that the second counter 205 instructs the shift register 206 to stop its output and shift operations until the count reaches 39 bits. Thereafter, the second counter 205 left-shifts the data inputted to the shift register 206 until the count reaches 42 bits in order to extract the PCR extension. When the count reaches 42 bits, the data in the shift register 206 is outputted from the output terminal 207 as 9-bit parallel data.

With the above operations, the PCR base and PCR extension constituting PCR are picked up from the packet.

Next, upon transition of the operation mode from the normal reproduction to specific reproduction, the control circuit 112 shown in FIG. 10 instructs the PCR memory 109 and PSI memory 110 to output PCR and PSI stored during the normal reproduction and at the same time turns the select switch 113 to the $P_1$ side. The multiplexer 111 multiplexes PCR and PSI inputted from the PCR memory 109 and PSI memory 110 in the form of a transport packet of MPEO. At this time, a discontinuity indicator flag in the packet header is set to "1". The multiplexed data is outputted to the select switch 113 and thereafter, an output end flag is supplied to the control circuit 112. Upon reception of the output end flag from the multiplexer 111, the control circuit 112 turns the select switch 113 to the $P_2$ side.

If the operation mode is the normal reproduction mode, the select switch 114 is turned to the N side and the normal reproduction data is inputted via the select switch 114 to the packeting circuit 115. If the operation mode is the specific reproduction mode, the select switch 114 is turned to the P side, and one-frame data for the specific reproduction in the sync block memory 106 or data obtained by multiplexing PCR and PSI at the multiplexer 111, is outputted via the select switch 114 to the packeting circuit 115. The packeting circuit 115 outputs the inputted data from the output terminal 116 in the unit of transport packet of MPEG.

With the above operations, in transitting from the normal reproduction to the specific reproduction, PCR and PSI for specific reproduction data reproduced from the recording medium during the normal reproduction and stored in the memories 109 and 110 are outputted from the output terminal 116. In this case, since the discontinuity indicator flag in the packet header has been set to "1", the decoder can recognize the discontinuity of the PCR value so that a malfunction can be avoided.

In the above manner, after the discontinuity indicator flag is set to "1", PSI for specific reproduction data stored during the normal reproduction is sent in response to a mode transition. Therefore, the period while the decoder is undecodable can be shortened.

Figure 12:
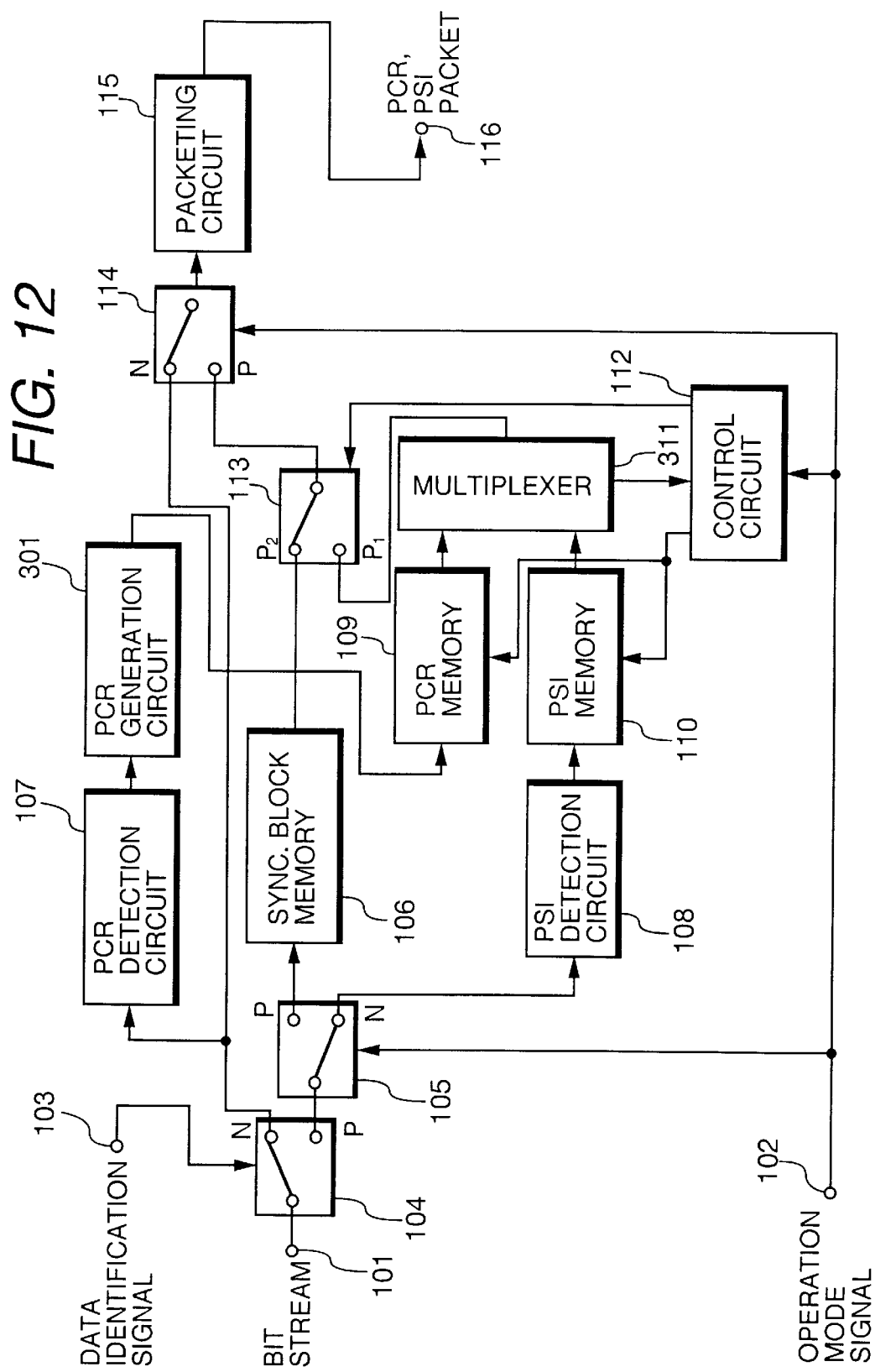
FIG. 12 is a block diagram showing the structure of a fourth embodiment of the invention.

FIG. 12 is a block diagram showing the fourth embodiment of the invention. Like elements to those shown in FIG. 10 are represented by using identical reference numerals, and the description thereof is omitted. In FIG. 12, reference numeral 301 represents a PCR generation circuit, and reference numeral 311 represents a multiplexer.

The operation of this circuit will be described below.

A bit stream inputted to the input terminal 101 is supplied to the select switch 104. A data identification signal is inputted from the input terminal 103 for the discrimination of whether the reproduction data is for normal reproduction or for specific reproduction. The selection switch 104 is controlled by the data discrimination signal from the input terminal 103, and selects the N side if the input data is for normal reproduction, and the P side if the input data is for specific reproduction.

If the input data is for specific reproduction, the input data is supplied to the PCR detection circuit 107 and select switch 114. PCR detected by the PCR detection circuit 107 is supplied to the PCR generation circuit 301. The PCR generation circuit 301 generates a PCR value in accordance with the input PCR value, the PCR value being outputted when the normal reproduction mode transits to the specific reproduction mode. Since PCR is required to be inputted to a MPEG decoder or an ATV decoder at each 100 msec interval, the PCR generation circuit 301 generates a PCR value having a maximum offset of 100 msec relative to the inputted PCR value.

Figure 13:
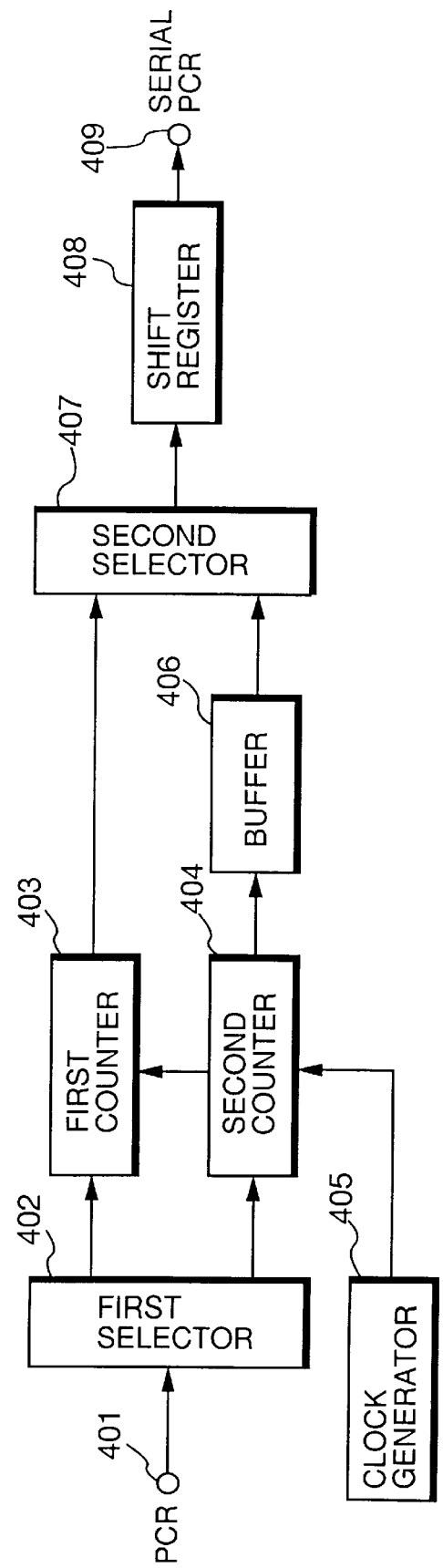
FIG. 13 is a block diagram showing an example of the structure of the PCR detection circuit of the fourth embodiment.

The PCR generation circuit 301 of FIG. 12 is configured such as shown in FIG. 13. In FIG. 13, reference numeral 401 represents an input terminal, reference numeral 402 represents a first selector, reference numeral 403 represents a first counter, reference numeral 404 represents a second counter, reference numeral 405 represents a clock generator, reference numeral 406 represents a buffer, reference numeral 407 represents a second selector, reference numeral 408 represents a shift register, and reference numeral 409 represents an output terminal.

PCR detected by the PCR detection circuit is inputted to the input terminal 401. The first selector 402, first counter 403, and second counter 404 are controlled by a timing circuit (not shown). Of PCR inputted from the input terminal 401, the PCR base is selected by the first selector 402 and inputted to the first counter 403, and the PCR extension is selected by the first selector 402 and inputted to the second counter 404. The clock generator 405 generates clocks having a frequency of 27 MHz. This clock is inputted to the second counter 404. The second counter 404 is a 9-bit counter, and after the PCR extension is loaded, the PCR extension is incremented by "1" each time clock is supplied from the clock generator 405.

The first counter 403 is a 33-bit counter and increments its count by "1" after the count of the second counter 404 reaches a predetermined maximum count. The maximum count of the second counter 404 is "299". After the count or PCR extension reaches "299", the count thereof becomes "0" and the count of the first counter 403 or PCR base increments by "1". With the above operations, the first counter 403 performs the equivalent operation of increasing its count by the clocks of 90 kHz.

An output of the first counter 403 is supplied to the second selector 407. An output of the second counter 404 is supplied to the buffer 406 whereat it is delayed to synchronize with the output timing to the second selector 401 and outputted to the second selector 407 by inserting an 8-bit field reserved by MPEG before the PCR extension outputted from the second counter 404. This 8-bit field is called reserved bits and generally has a binary value of "111111". An output of the second selector 407 is supplied to the shift register 408 and converted from serial data into parallel data which is outputted from the output terminal 409.

With the above operations, the PCR generation circuit 301 generates PCR in conformity with grammars defined by MPEG or ATV.

In FIG. 12, PCR outputted from the PCR generation circuit is stored in the PCR memory 109.

If data inputted to the input terminal 101 is data for specific reproduction, the data is supplied to the select switch 105. The select switch 105 is controlled by an operation mode signal supplied to the input terminal 102 thereof, and if the operation mode is a specific reproduction mode, the select switch 105 is turned to the P side, whereas if the operation mode is a normal reproduction mode, it is turned to the N side. In the case of the specific reproduction mode, the input data is supplied to the sync block memory 106 and reconfigured as one-frame data. In the case of the normal reproduction mode, the input data is supplied to the PSI detection circuit 108 to extract PSI which is stored in the PSI memory 110.

Upon transition of the operation mode from normal reproduction to specific reproduction, the control circuit 112 instructs the PCR memory 109 and PSI memory 110 to output PCR and PSI stored during the normal reproduction and at the same time the select switch 113 is turned to the $P_1$ side. The multiplexer 311 multiplexes PCR and PSI inputted from the PCR memory 109 and PSI memory 110 in the form of a transport packet. At this time, the PCR value maintains the continuity of the PCR value during the normal reproduction. Therefore, the multiplexed data is outputted to the select switch 113 and thereafter an output end flag is supplied to the control circuit 112. Upon reception of the output end flag, the control circuit 112 turns the select switch 113 to the $P_2$.

If the operation mode is the normal reproduction mode, the select switch 114 is turned to the N side and data for normal reproduction is inputted via the select switch 114 to the packeting circuit 115. If the operation mode is the specific reproduction mode, the select switch 114 is turned to the P side, and one-frame data for specific reproduction stored in the sync block memory 106 or multiplexed data of PCR and PSI from the multiplexer, is inputted via the select switch 114 to the packeting circuit 115. The packeting circuit 115 outputs the inputted data from the output terminal 116 in the transport packet unit of MPEG.

With the above operations, in transitting from the normal reproduction to specific reproduction, PCR and PSI for specific reproduction data reproduced from a recording medium during the normal reproduction and stored in the memories 109 and 110 are outputted from the output terminal 116. At this time since the PCR value maintains a continuity with the PCR value during the normal reproduction, a malfunction of the decoder can be avoided.

In the above manner, the PCR value with a continuity with the PCR value during the normal reproduction and PSI for specific reproduction data stored during the normal reproduction are outputted upon transition of the operation mode. Accordingly, the period while the decoder is undecodable can be shortened.

As described above, in the above embodiment, identification data for specific reproduction data is detected during the normal reproduction and stored. Accordingly, by using the identification information stored during the mode transition, the undecodable period of the decoder for decoding encoded data can be shortened and disturbance and loss of the reproduced image can be reduced.

Furthermore, upon transition from the normal reproduction to specific reproduction, a signal representative of a discontinuity in time signals is embedded in the reproduction data so that an erroneous operation of the decoder can be avoided.

Still further, a signal equivalent to time signals in reproduction data is generated, and upon transition from the normal reproduction to specific reproduction, the signal maintaining the continuity is outputted and embedded in the reproduced encoded data. Therefore, a malfunction of the decoder can be avoided.

Still another embodiment of the invention will be described. FIG. 14 is a block diagram showing an embodiment of a recording/reproducing apparatus of the invention. This embodiment applies the invention to a video recorder for recording an MPEG transport stream or ATV bit stream.

In FIG. 14, reference numeral 1 represents an input terminal, reference numeral 2 represents a demultiplexer, reference numeral 3 represents a header detection circuit, reference numeral 4 represents a frame memory, reference numeral 5 represents a memory control circuit, reference numeral 6 represents a first buffer, reference numeral 7 represents a multiplexer, reference numeral 8 represents a parity generation circuit, reference numeral 9 represents a modulation circuit, reference numeral 10 represents a record amplifier, reference numeral 11 represents a recording head, reference numeral 12 represents a magnetic tape, reference numeral 13 represents a reproducing head, reference numeral 14 represents a reproduction amplifier, reference numeral 15 represents a reproduction equalizer circuit, reference numeral 16 represents a demodulation circuit, reference numeral 17 represents a sync detection circuit, reference numeral 18 represents an error correction circuit, reference numeral 19 represents a second buffer, reference numeral 20 represents a PCR detection circuit, reference numeral 21 represents a PCR generation circuit, reference numeral 22 represents an input terminal for a control signal, reference numeral 23 represents a system control circuit, reference numeral 24 represents a first selector, reference numeral 25 represents a second selector, reference numeral 26 represents a sync block memory, reference numeral 27 represents a packeting circuit, and reference numeral 28 represents an output terminal. The recording head 11 and reproducing head 13 each have two rotary magnetic heads.

The operation of this circuit will be described below.

In recording, an MPEG transport stream or ATV bit stream inputted to the input terminal 1 is supplied to the demultiplexer 2 and first buffer 6 to give the stream some delay. The demultiplexer 2 extracts an image information bit train from the multiplexed bit train. An output of the demultiplexer 2 is inputted to the header detection circuit 3 and frame memory 4.

The header detection circuit 3 picks up various header information from the bit train extracted by the demultiplexer 2. The header detection circuit 3 outputs this header information to the memory control circuit 5. The image data extracted by the demultiplexer 2 is stored in the frame memory 4. This image data is one-frame data, and the memory control circuit 5 selects one frame from the header information supplied from the header detection circuit 3 and inputs it to the frame memory 4.

The multiplexer 7 multiplexes the bit train delayed by the first buffer 6 and the bit train for specific reproduction data outputted from the frame memory 4. The multiplexed bit train is added with an error correction code by the parity generation circuit 8, modulated by the modulation circuit 9, amplified by the record amplifier 10, and thereafter recorded on the magnetic tape 12 by the recording head 12.

In reproducing, data recorded on the magnetic tape 12 is reproduced by the reproducing head 13. The data reproduced by the reproducing head 13 is amplified by the reproduction amplifier 14, and interference between codes is suppressed by the reproduction equalizer circuit 15. An output of the reproduction equalizer circuit 15 is supplied to and demodulated by the demodulation circuit 16. An output of the demodulation circuit 16 is supplied to the sync detection circuit 17 for the synchronization with the video tape recorder. An output of the sync detection circuit 17 is supplied to the error correction circuit 18 to detect and correct any error of the data.

An output of the error correction circuit 18 is supplied to and delayed by the second buffer 19, and also supplied to the PCR detection circuit 20 to detect a current PCR value. The PCR generation circuit 21 generates the next PCR value in accordance with the PCR value detected by the PCR detection circuit 20. As described earlier, since PCR is required to be inputted to a MPEG decoder or an ATV decoder at each 100 msec interval, the PCR generation circuit 21 generates a PCR value having a maximum offset of 100 msec relative to the current PCR value detected by the PCR detection circuit 20.

A control signal for designating specific reproduction or normal reproduction is inputted to the control signal input terminal 22. This control signal is supplied to the system control circuit 23. By using this control signal, the system control circuit 23 controls the first and second selectors 24 and 25 and instructs the PCR generation circuit 21 to generate PCR.

If the normal or specific reproduction continues, the system control circuit 23 turns the first selector 24 to an al terminal connected to the output of the second buffer 19. Since PCRs sent to the MPEG decoder or ATV decoder are recorded on the magnetic tape 12, they have continuous values. However, if a control signal designating the specific reproduction is inputted to the control signal input terminal 22 during the normal reproduction, the tape transport system such as a reel and capstan (not shown) cannot transit at once to the specific reproduction and PCR recorded on the magnetic tape 12 cannot be reproduced. Therefore, PCR is not outputted from the second buffer 19. This is also true in the case where a control signal designating the normal reproduction is inputted to the control signal input terminal 22 during the specific reproduction, and PCR is not reproduced.

Upon transition from normal reproduction to specific reproduction or vice versa, the system control circuit 23 turns the first selector 24 to a b1 terminal and instructs the PCR generation circuit 21 to continuously generate PCRs in accordance with the PCR value detected by the PCR detection circuit 20. With these operations, even if PCRs cannot be reproduced, PCRs can be continuously sent to the following stages and outputted to the MPEG decoder or ATV decoder.

In the normal reproduction, the system control circuit 23 turns the second selector 25 to a b2 terminal. In the normal reproduction, reproduced image data is packeted by the packeting circuit 27 in the MPEG or ATV packet format, and outputted from the output terminal 28. In the specific reproduction, the system control circuit 23 turns the second selector 25 to the a2 terminal. Image data for specific reproduction is recorded on the magnetic tape 12 at discontinuous positions so that it is discontinuously reproduced. In the specific reproduction, the discontinuously reproduced image data is inputted via the a2 terminal of the second selector 25 to the sync block memory 26 and reconfigured as one-frame data. This one-frame data is packeted by the packeting circuit 27 and outputted from the output terminal 28.

The PCR detection circuit 20 is structured such as shown in FIG. 15. In FIG. 15, reference numeral 101 represents an input terminal, reference numeral 102 represents a sync byte detection circuit, reference numeral 103 represents a first counter, reference numeral 104 represents a comparator, reference numeral 105 represents a second counter, reference numeral 106 represents a shift register, and reference numeral 107 represents an output terminal.

Packet data inputted from the input terminal 101 is supplied to the sync byte detection circuit 102 to detect an 8-bit sync byte contained in the packet data for the synchronization with each packet. After the establishment of the synchronization with each packet, the packet data is supplied to the first counter 103, comparator 104, and shift register 106.

The first counter 103 counts the number of bits of the packet. Namely, the first counter 103 resets the count in response to an output of the sync byte detection circuit 102, and starts counting from the bit next to the last bit of the sync byte. When the count of the first counter 103 reaches 19 bits, it outputs a comparison permission signal to the comparator 104. The bit of this signal is the first bit in adaptation field control. If this bit is "1", an adaptation field which possibly contains PCR is contained in the same packet. The comparator 104 compares the bit with "1". If the bit is "1", it instructs the first counter 103 to continue counting bits. If the bit is "0", the comparator 104 instructs the first counter 103 to stop its counting operation and wait for the next packet input.

When the count reaches 36 bits, the first counter 103 outputs a comparison permission signal to the comparator 104. The bit of this signal is a PCR flag. If this bit is "1", PCR is present in the adaptation field of the same packet. The comparator 104 compares the PCR flag with "1", it instructs the first counter 103 to continue counting bits if the flag is "1", and it instructs the first counter 103 to stop its counting operation and wait for the next packet input if the flag is "0". When the count reaches 40 bits, the first counter 103 allows the second counter 105 to count bits. The second counter 105 then counts the data field of PCR.

The second counter 105 counts the bits of PCR. The shift register 106 converts PCR from serial data into parallel data under the control of the second counter 105, and outputs the parallel data from the output terminal 107. PCR is extracted from the packet data as timing data by the second counter 105 and shift register 106. PCR has a bit field of 42 bits and is divided into two parts, one being a 33-bit part called a PCR base and the other being a 9-bit part called a PCR extension. A 6-bit field reserved by MPEG is being inserted between the PCR base and PCR extension.

The second counter 105 shifts the data inputted to the shift register 106 until the count reaches 33 bits in order to extract the PCR base. When the count reaches 33 bits, the data in the shift register 106 is outputted from the output terminal 107 as 33-bit parallel data. The following 6-bit data is invalid data so that the second counter 105 instructs the shift register 106 to stop its output and shift operations until the count reaches 39 bits. Thereafter, the second counter 105 shifts the data inputted to the shift register 106 until the count reaches 42 bits in order to extract the PCR extension. When the count reaches 42 bits, the data in the shift register 106 is outputted from the output terminal 107 as 9-bit parallel data.

With the above operations, the PCR base and PCR extension constituting PCR are picked up from the packet.

The PCR generation circuit 21 of FIG. 14 is configured such as shown in FIG. 16. In FIG. 16, reference numeral 151 represents an input terminal, reference numeral 152 represents a first selector, reference numeral 153 represents a first counter, reference numeral 154 represents a second counter, reference numeral 155 represents a clock generator, reference numeral 156 represents a buffer, reference numeral 157 represents a second selector, reference numeral 158 represents a shift register, and reference numeral 159 represents an output terminal.

PCR detected by the PCR detection circuit 20 is inputted to the input terminal 151. The first selector 152, first counter 153, and second counter 154 are controlled by a timing circuit (not shown). Of PCR inputted from the input terminal 151, the PCR base is selected by the first selector 152 and inputted to the first counter 153, and the PCR extension is selected by the first selector 152 and inputted to the second counter 154. The clock generator 155 generates clocks having a frequency of 27 MHz. This clock is inputted to the second counter 154. The second counter 154 is a 9-bit counter, and after the PCR extension is loaded, the PCR extension is incremented by "1" each time clock is supplied from the clock generator 155.

The first counter 153 is a 33-bit counter and increments its count by "1" after the count of the second counter 154 reaches a predetermined maximum count. The maximum count of the second counter 154 is "299". After the count or PCR extension reaches "299", the count thereof becomes "0" and the count of the first counter 153 or PCR base increments by "1". With the above operations, the first counter 153 performs the equivalent operation of increasing its count by the clocks of 90 MHz.

An output of the first counter 153 is supplied to the second selector 157. An output of the second counter 154 is supplied to the buffer 156 whereat it is delayed to synchronize with the output timing to the second selector 157 and outputted to the second selector 157 by inserting a 6-bit field reserved by MPEG before the PCR extension outputted from the second counter 154. This 6-bit field is called reserved bits and generally has a binary value of "111111". An output of the second selector 157 is supplied to the shift register 158 and converted from serial data into parallel data which is outputted from the output terminal 159.

With the above operations, the PCR generation circuit 21 generates PCR in conformity with grammars defined by MPEG or ATV.

With this embodiment, a video tape recorder for recording an MPEG transport stream or ATV bit stream can be configured which can perform specific reproduction and output PCR to the decoder even during a transition period from specific reproduction to normal reproduction or vice versa. With this structure, the MPEG decoder or ATV decoder can decode a bit stream outputted by the video tape recorder of this invention without any delay.

In this embodiment, although the MPEG transport stream or ATV bit stream has been described, obviously, other streams such as an MPEG program stream and a highly efficiently encoded bit stream may also be used.

As described so far, according to the present invention, in a recording/reproducing apparatus using prediction coding or in a recording/reproducing apparatus for recording/reproducing prediction encoded data, it is possible to perform specific reproduction and normal reproduction without any delay even during a transition period from the specific reproduction to normal reproduction or vice versa.

What is claimed is:

1. A reproduction apparatus for reproducing a signal from a recording medium in which a normal reproduction data, a normal decode information, a specific reproduction data, and a specific decode information are recorded in a predetermined order, said reproduction apparatus comprising:
   (a) detecting means for detecting the normal decode information from a reproduced data in a specific mode, and for detecting said specific decode information in a normal reproduction mode;
   (b) memory means for storing said normal decode information in said specific reproduction mode, and for storing said specific decode information in said normal reproduction mode; and
   (c) decoding means for decoding said normal reproduction data in said normal mode by using said normal decode information outputted from said memory means when said normal decode information is not obtained from the reproduced data, and for decoding said specific reproduction data in said specific mode by using said specific decode information outputted from said memory means when said specific decode information is not obtained from the reproduced data.

2. Apparatus according to claim 1, further comprising update means for updating, if said normal decode information is reproduced during the normal reproduction mode, the contents of said memory means by the latest one of a reproduced normal decode information.

3. Apparatus according to claim 2, wherein said update means updates, if said normal decode information is reproduced from the normal reproduction data during the specific reproduction mode, the contents of said memory means by the latest one of said reproduced normal decode information for the normal reproduction data.

4. Apparatus according to claim 1, further comprising output control means for reading and outputting the normal decode information if said normal decode information is being stored in said memory means, and for not outputting said normal decode information if said normal decode information is not stored in said memory means, respectively when the specific reproduction mode transits to the normal reproduction mode.

5. Apparatus according to claim 1, further comprising first detection means for detecting program identification information for identifying each of a plurality of programs contained in said normal reproduction data, storage means for storing the detected program identification information, and second detection means for detecting a change in said program identification information of the specific reproduction data during the specific reproduction mode and clearing the contents of said memory means.

6. Apparatus according to claim 5, wherein said program identification information comprises PID.

7. Apparatus according to claim 1, wherein said normal reproduction data comprises image data obtained by multiplexing intra-frame encoded data and inter-frame encoded data.

8. Apparatus according to claim 1, wherein said normal reproduction data comprises ATV encoded data.

9. Apparatus according to claim 1, wherein said normal decode information comprises PSI.

10. Apparatus according to claim 1, wherein the specific reproduction mode comprises a fast reproduction mode.

11. A reproduction apparatus for reproducing a signal from a recording medium in which a normal reproduction data, and identification information, a specific reproduction data, and a specific identification information are recorded in a predetermined order, said reproduction apparatus comprising:
   (a) detecting means for detecting said identification information from a reproduced data in a specific mode, and for detecting said specific identification information in a normal reproduction mode;
   (b) memory means for storing said identification information in said specific reproduction mode, and for storing said specific identification information in said normal reproduction mode; and
   (c) decoding means for decoding said normal reproduction data in said normal mode by using said identification information outputted from said memory means when said identification information is not obtained from the reproduced data, and for decoding said specific reproduction data in said specific mode by using said specific identification information outputted from said memory means when said specific identification information is not obtained from the reproduced data.

12. Apparatus according to claim 11, wherein if said specific identification information of the specific reproduction data is reproduced in the normal reproduction mode, the contents of said memory means is updated by the latest one of a specific reproduced identification information.

13. Apparatus according to claim 11, wherein when the normal reproduction mode transits to a specific reproduction mode, said specific identification information stored in said memory means is read and outputted.

14. Apparatus according to claim 11, wherein a time signal contained in the normal reproduction data is detected, and when the normal reproduction mode transits to the specific reproduction mode, a signal indicating a discontinuity of said time signal is embedded in the normal reproduction data.

15. Apparatus according to claim 11, wherein the normal reproduction data comprises image data obtained by multiplexing intra-frame encoded data and inter-frame encoded data.

16. Apparatus according to claim 11, wherein the normal reproduction data comprises MPEG-2 encoded data.

17. Apparatus according to claim 11, wherein the normal reproduction data comprises ATV encoded data.

18. Apparatus according to claim 11, wherein said identification information comprises PSI.

19. A reproduction apparatus for reproducing a signal from a recording medium in which a normal reproduction data, a normal time signal, a specific reproduction data, and a specific time signal are recorded in a predetermined order, said reproduction apparatus comprising
   time signal generation means for generating a time signal having the same format as a time signal contained in reproduced normal reproduction data; and control means for controlling said time signal generation means to generate, when a normal reproduction mode transits to a specific reproduction mode, a time signal having a continuity with a time signal in the normal reproduction mode.

20. Apparatus according to claim 19, wherein said time signal generation means generates a PCR.

21. A recording/reproducing apparatus comprising:
   (a) encoded data reconfiguration means for receiving encoded data formed by multiplexing intra-frame encoded image data and inter-frame encoded image data, and for selecting the intra-frame encoded image data from the received encoded data and reconfiguring the selected intra-frame encoded image data;
   (b) record means for recording an output of said encoded data reconfiguration means on a recording medium at a predetermined position;

(c) reproduction means for reproducing and outputting data recorded on the recording medium by said record means, said reproduction means having a normal reproduction mode and a specific reproduction mode;

(d) time signal generation means for generating a signal by using a time signal contained in an output of said reproduction means; and (e) sync signal generation means capable of generating a sync signal in accordance with either one of the time signal contained in an output of said reproduction means and said signal generated by said time signal generation means, wherein said sync signal generation means generates the signal generated by said time signal generation means during a transition period between the normal reproduction mode and the specific reproduction mode.

22. A recording/reproducing apparatus according to claim 21, wherein said encoded data reconfiguration means extracts low frequency components of the recorded encoded data to reconfigure said intra-frame encoded image data.

23. A recording/reproducing apparatus according to claim 21, further comprising memory means for storing an output of said reproduction means and an output of said sync signal generation means during a transition period between operation of said reproduction means at a normal speed and operation of said reproduction means at the predetermined increased speed.

24. A recording/reproducing apparatus according to claim 21, wherein said received encoded data comprises MPEG encoded data.

25. A recording/reproducing apparatus according to claim 21, wherein said received encoded data comprises ATV encoded data.

26. A recording/reproducing apparatus according to claim 21, wherein said sync signal generation means generates PCR.

27. A recording/reproducing apparatus according to claim 21, wherein said sync signal generation means generates an SCR.

28. A reproduction apparatus for reproducing data from a recording medium on which are recorded, in a predetermined order, (i) normal reproduction data, (ii) normal identification information associated with the normal reproduction data, (iii) specific reproduction data, and (iv) specific identification information associated with the specific reproduction data, said apparatus comprising:

detecting means for detecting the identification information from reproduced data in one of two different reproduction modes;

memory means for storing the detected identification information in said one reproduction mode; and decoding means for decoding the reproduction data in the other reproduction mode by using identification information output from said memory means when the identification information for that data has not been obtained from the reproduced data.

29. Apparatus according to claim 28, wherein said detecting means is adapted to detect the specific identification information in a normal reproduction mode, said memory means storing the specific identification information in the normal reproduction mode, and said decoding means decoding the specific reproduction data in said specific reproduction mode by using the specific identification information outputted from said memory means when the specific identification information is not obtained from the reproduced data.

30. Apparatus according to claim 28, wherein the identification information comprises Program Specific Information.

31. Apparatus according to claim 30, wherein the specific identification information comprises Program Specific Information.

32. Apparatus according to claim 28, wherein when the specific reproduction mode changes to a normal reproduction mode, the identification information stored in said memory means is read and output for decoding.

33. Apparatus according to claim 28, wherein the identification information of the normal reproduction data is reproduced in the specific reproduction mode, and wherein the contents of said memory means are updated by the latest one of a normal reproduced identification information.

34. Apparatus according to claim 28, wherein the normal reproduction data comprises image data obtained by multiplexing intra-picture encoded data and inter-picture encoded data.

35. Apparatus according to claim 28, wherein the normal reproduction data comprises MPEG-2 encoded data.

36. Apparatus according to claim 28, wherein the normal reproduction data comprises TV encoded data.

37. Apparatus according to claim 28, further comprising:

first detection means for detecting program identification information identifying normal reproduction data;

means for storing the detected program identification information; and second detection means for detecting a change in the program identification information of the specific reproduction data during the specific reproduction mode in clearing the contents of said storage means.

38. Apparatus according to claim 28, further comprising means for outputting a time signal contained in the normal reproduction data, and when the normal reproduction mode changes to the specific reproduction mode, a signal indicating a discontinuity of the time signal is embedded in the normal reproduction data.

39. Apparatus according to anyone of claims 28, 29, 30, 31, 32, 33, 34, 35, 36, 37, and 38, further comprising:

time signal generation means for generating a time signal having the same format as a time signal contained in reproduced normal reproduction data; and control means for controlling the time signal generation means to generate, when a normal reproduction mode changes to a specific reproduction mode, the time signal having a continuity with a time signal in the normal reproduction mode.

40. Apparatus according to claim 39, wherein the time signal generation means generates a Program Clock Reference.

41. A method of reproducing data from a recording medium on which are sequentially recorded by a recording apparatus, (i) normal reproduction data, (ii) normal identification associated with the normal reproduction data, (iii) specific reproduction data, and (iv) specific identification information associated with the specific reproduction data, comprising the steps of:

detecting the identification information from reproduced data in one of at least two reproduction modes;

storing in a memory the identification information detected in said one reproduction mode;

decoding the reproduction data in another reproduction mode by using identification information output from said memory when the identification information for that data has not been obtained from the reproduced data.

42. A method according to claim 41, wherein the normal identification information comprises Program Specific Information.

43. A method according to claim 42, wherein the specific identification information comprises Program Specific Information.

44. A method according to claim 41, wherein the normal reproduction data comprises image data obtained by multiplexing intra-picture encoded data and inter-picture encoded data.

45. A method according to claim 41, wherein the normal reproduction data comprises MPEG-2 encoded data.

46. A method according to claim 44, wherein the normal reproduction data comprises ATV encoded data.

47. A method according to claim 41, further comprising the steps of:

generating a time signal having the same format as a time signal contained in reproduced normal reproduction data; and controlling the time signal generation means to generate, when a normal reproduction mode transits to a specific reproduction mode, a time signal having continuity with the time signal in the normal reproduction mode.

48. A method according to claim 47, wherein the time signal comprises a Program Clock Reference.

49. The reproduction method for reproducing a signal from a recording medium in which normal reproduction data, a normal time signal, specific reproduction data, and a specific time signal are recorded in a predetermined order, comprising the steps of:

generating a time signal having the same format as a time signal contained in reproduced normal reproduction data;

controlling said generating step to generate, when a normal reproduction mode transits to a specific reproduction mode, a time signal having a continuity with a time signal in the normal reproduction mode.

50. The recording/reproducing method comprising the steps of:

receiving encoded data formed by multiplexing intra-frame encoded image data and inter-frame encoded image data, and selecting the intra-frame encoded image data from the received encoded data and reconfiguring the selected intra-frame encoded image data;

recording an output of said receiving step on a recording medium at a predetermined position;

reproducing and outputting data recorded on the recorded medium, said reproduction step having a normal reproduction mode and a specific reproduction mode;

generating a signal by using a time signal contained in an output of said reproduction steps; and generating a sync signal in accordance with either one of the time signal contained in an output of said reproduction step and the signal generated in said generating step, wherein the sync signal is generated during a transition period between the normal reproduction mode and the specific reproduction mode.

51. A reproduction method for reproducing a signal from a recording medium on which normal reproduction data, normal decode information, specific reproduction data, and specific decode information are recorded in a predetermined order, comprising the steps of:

detecting the normal decode information from reproduced data in a specific mode, and detecting said specific decode information in a normal reproduction mode;

storing in a memory said normal decode information in said specific reproduction mode, and storing in said memory said specific decode information in said normal reproduction mode; and decoding the normal reproduction data in the normal mode by using the normal decode information outputted from said memory when the normal decode information is not obtained from the reproduced data, and for decoding the specific reproduction data in said specific mode by using the specific decode information outputted from said memory when said specific decode information is not obtained from the reproduced data.

52. A reproduction method for reproducing a signal from a recording medium in which normal reproduction data, identification information, specific reproduction data, and specific identification information are stored in a predetermined order, comprising the steps of:

detecting the identification information from reproduced data in a specific mode, and detecting the specific identification information in a normal reproduction mode;

storing in a memory said identification information in the specific reproduction mode, and for storing in the memory said specific identification information in the normal reproduction mode; and decoding the normal reproduction data in said normal mode by using the identification information outputted from said memory when said identification information is not obtained from the reproduced data, and decoding said specific reproduction data in the specific mode by using said specific identification information outputted from said memory when the specific identification information is not obtained from the reproduced data.

* * * * *

UNITED STATES PATENT AND TRADEMARK OFFICE
CERTIFICATE OF CORRECTION

PATENT NO. : 6,052,507

DATED : April 18, 2000

INVENTOR(S): MITSUO NIIDA, ET AL.

It is certified that error appears in the above-identified patent and that said Letters Patent is hereby corrected as shown below:

<u>COVER PAGE AT ITEM [56] RC</u>:
Foreign Patent Documents: "W094176631 8/1994 WIPO" should read
--W09417631 8/1994 WIPO--.

<u>COLUMN 3</u>:
Line 29, "transitting" should read --transiting--; and
Line 65, example" should read --example of--.

<u>COLUMN 10</u>:
Line 46, "transitting" should read --transiting--.

<u>COLUMN 12</u>:
Line 49, "transitting" should read --transiting--.

<u>COLUMN 16</u>:
Line 32, "al" should read --a1--.

<u>COLUMN 19</u>:
Line 7, "specific" should read --specific reproduction--;
Line 15, "normal" should read --normal reproduction--; and
Line 19, "specific" should read --specific reproduction--.

<u>COLUMN 20</u>:
Line 2, "specific" should read --specific reproduction--;
Line 9, "normal" should read --normal reproduction--; and
Line f13, "specific" should read --specific reproduction--.

UNITED STATES PATENT AND TRADEMARK OFFICE
CERTIFICATE OF CORRECTION

PATENT NO. : 6,052,507

DATED : April 18, 2000

INVENTOR(S): MITSUO NIIDA, ET AL.

It is certified that error appears in the above-identified patent and that said Letters Patent is hereby corrected as shown below:

COLUMN 24:
Line 14, "specific" should read --specific reproduction--;
Line 20, "normal" should read --normal reproduction--;
Line 25, "specific" should read --specific reproduction--;
Line 35, "specific" should read --specific reproduction--;
Line 43, "normal" should read --normal reproduction--; and
Line 47, "specific" should read --specific reproduction--.

Signed and Sealed this

Twenty-second Day of May, 2001

Attest:

NICHOLAS P. GODICI

Attesting Officer        Acting Director of the United States Patent and Trademark Office